United States Patent [19]

Gleba et al.

[11] Patent Number: 4,656,593
[45] Date of Patent: Apr. 7, 1987

[54] MULTI-FUNCTION LOAD CONTROLLER FOR CARRIER LOAD CONTROL SUBSYSTEM

[75] Inventors: James S. Gleba, Cromwell; James A. Stamatien, West Haven; Gregory B. Fortune, Unionville, all of Conn.

[73] Assignee: Westinghouse Electric Corp., Pittsburgh, Pa.

[21] Appl. No.: 736,171

[22] Filed: May 20, 1985

[51] Int. Cl.⁴ .................. G01R 21/00; G06F 15/56
[52] U.S. Cl. .................................... 364/492; 307/38; 340/310 R
[58] Field of Search .............. 371/37; 364/492, 493; 340/825.02, 825.03, 825.06, 310, 310 A; 307/38, 40

[56] References Cited

U.S. PATENT DOCUMENTS

| | | | |
|---|---|---|---|
| 3,911,415 | 10/1975 | Whyte | 340/310 A |
| 3,942,168 | 3/1976 | Whyte | 340/310 R |
| 4,091,361 | 5/1978 | Eichelberger et al. | 340/825.53 |
| 4,167,786 | 9/1979 | Miller et al. | 364/493 |
| 4,168,531 | 9/1979 | Eichelberger et al. | 364/900 |
| 4,173,754 | 11/1979 | Feiker | 340/310 R |
| 4,185,272 | 1/1980 | Feiker | 340/825.07 |
| 4,213,182 | 7/1980 | Eichelberger et al. | 364/493 |
| 4,348,668 | 9/1982 | Gurr et al. | 340/825.06 |
| 4,367,414 | 1/1983 | Miller et al. | 307/38 |
| 4,396,844 | 8/1983 | Miller et al. | 307/39 |
| 4,402,059 | 8/1983 | Kennon et al. | 364/900 |
| 4,427,968 | 1/1984 | York | 340/310 R |
| 4,429,366 | 1/1984 | Kennon | 364/482 |
| 4,454,509 | 6/1984 | Buennagel et al. | 340/825.69 |
| 4,489,385 | 12/1984 | Miller et al. | 364/493 |

Primary Examiner—Charles E. Atkinson
Attorney, Agent, or Firm—M. J. Moran

[57] ABSTRACT

A low cost, software based, 4 bit microprocessor is pin configurable to function either as a central controller in a communication and control network or as a slave load control unit in said network. The microprocessor when configured as a slave unit can also function as a customer service unit to inform a customer of existing utility rates and permit him to override an existing load management schedule if he so desires.

32 Claims, 18 Drawing Figures

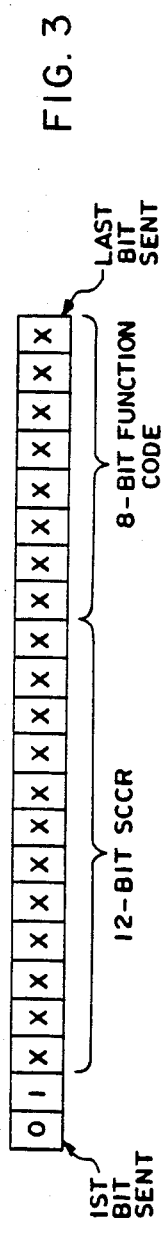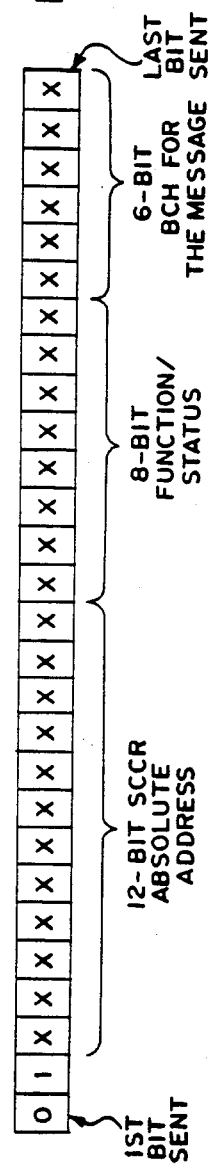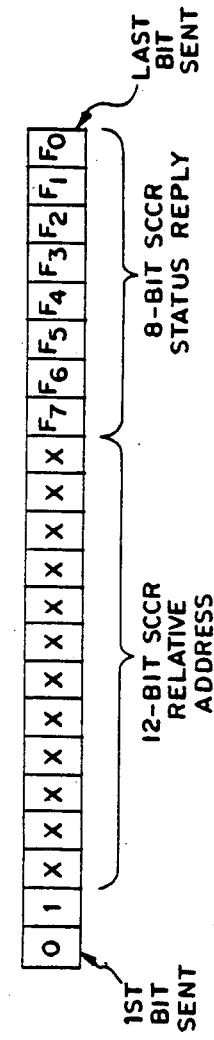

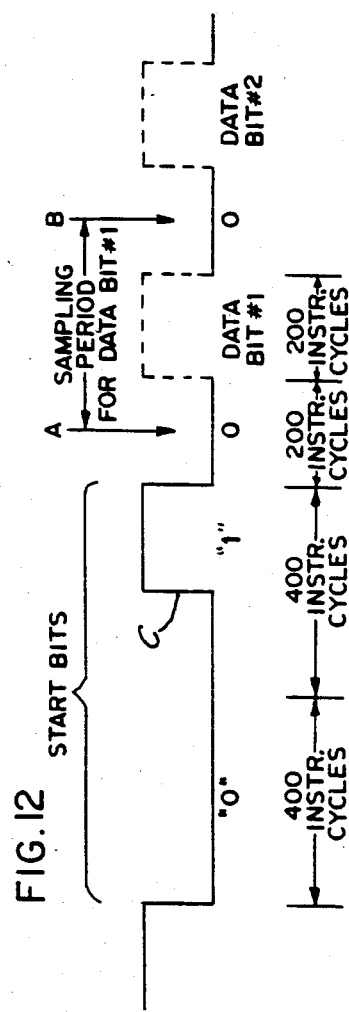
FIG. 12
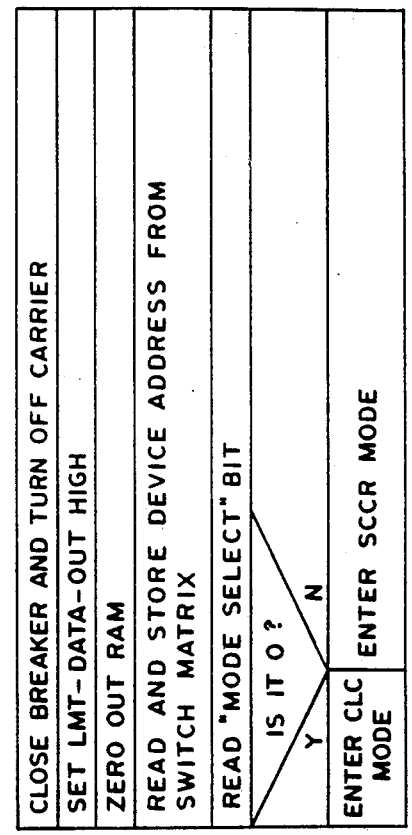
FIG. 13 POWER UP SEQUENCE

SCCR MODE

READING DATA FROM THE CARRIER LINE (SUB 4)

SENDING DATA OUT THE CARRIER LINE (SUB 3)

CLC MODE

CLC MODE

MULTI-FUNCTION LOAD CONTROLLER FOR CARRIER LOAD CONTROL SUBSYSTEM

CROSS REFERENCE TO RELATED APPLICATIONS

The invention disclosed herein relates to two-way communication and control systems. The following four commonly assigned United States patent applications were all filed in the United States Patent and Trademark Office on June 28, 1984 and relate to such communication and control systems: Ser. No. 625,747 filed by William R. Verbanets and entitled Multipurpose Digital IC for Communication and Control Network: Ser. No. 625,863 filed by William R. Verbanets and Theodore H. York and entitled Improved Digital IC-Microcomputer Interface; Ser. No. 625,862 filed by Leonard C. Vercellotti and William R. Verbanets and entitled Low Error Rate Digitial Demodulator; and Ser. No. 625,864 filed by Leonard C. Vercellotti, William R. Verbanets and Theodore H. York entitled Digital Message Format for Two-Way Communication and Control Network.

BACKGROUND OF THE INVENTION

A. Field of the Invention

The present invention relates generally to two-way communication and control systems, and, more particularly, to communication and control systems in which a number of remotely positioned controllable devices such as circuit breakers, motor control relays, lighting systems, and the like may be controlled from a central or master controller over a common network line.

While the invention is of general application in such control systems, it is particularly suitable for use with and will be described in connection with a line carrier control subsystem intended for residential use in conjunction with a load management terminal associated with the watt hour meter of the residence and controlled by a public utility over its power distribution system. Specifically, the present invention is concerned with a low cost software based digital IC which is pin configurably to operate either as a central controller associated with the utility load management terminal, or as a slave unit associated with a particular circuit breaker controlling a predetermined residential load device, or as a customer service unit by means of which the residential utility customer can be informed of the existing utility rate schedule, i.e. the cost of AC power per kw hour, and can control certain slave units associated with different residential loads by selectively activating corresponding switches on the customer service unit.

B. Description of the Prior Art

Various communication and control systems have been heretofore proposed for controlling a group of remotely located devices from a central controller over a common network line, such as a power line. For example, in Feiker U.S. Pat. Nos. 4,173,754 and 4,185,272 an arrangement is disclosed wherein a redundant digital address and function code is generated at a control station which is transmitted over a power line to a group of receiver-decoders individually associated with different controlled apparatus. However, the central station requires a relatively complex and expensive CPU, such as an Intel 8080A, and one or more separate random access memories. Also, the receiver-decoder at each remote station is of the type shown in Eichelberger et al U.S. Pat. No. 4,091,361 wherein a large number of hardware components are employed to receive and decode a message and exercise a desired control function. With such an arrangement it is not possible to provide a common software based digital IC which can function as either a central controller or a remote receiver-decoder by simply selecting different pins on the digital IC to establish the desired function of the device. Furthermore, in the prior art arrangement of these patents noise immunity is said to be achieved by redundantly transmitting the digital address and function code and delaying performance of the desired control function until the correct address portion of the code has been received at least two times out of three. However, such an arrangement substantially reduces the throughput of the system because it requires transmitting each message a minimum of three times irrespective of the noise level on the common network line.

Eichelberger et al U.S. Pat. No. 4,213,182 and Miller U.S. Pat. No. 4,167,786 also disclose a communication and control system in which the central controller requires a relatively complex and expensive CPU and the load control processor at each remote station is hardware based. Also, the system disclosed in these patents requires the transmission of complementary bytes for both address and data to provide security against errors in transmission. In Miller, et al U.S. Pat. No. 4,367,414 a further type of communication and control system is disclosed in which different types of microcomputers are employed at the central station and at a large number of remote stations which are connected to the central stastion by means of a dedicated twisted pair line as the common network line. U.S. Pat. Nos. 4,213,182, 4,167,786 and 4,367,414 are not concerned with the transmission of modulated carrier signals over a power line or the reception of such signals in the noisy environment usually encountered on power lines.

There have also been developed various types of communication systems for electrical distribution networks wherein a power line carrier system is employed to provide communication between the central station and load management terminals which are utilized as end devices in the utility's distribution network communication system. Such communication systems and load management terminals are shown in Whyte U.S. Pat. No. 3,911,415, Whyte U.S. Pat. No. 3,942,168, York U.S. Pat. No. 4,427,968, Kennon et al. U.S. Pat. No. 4,402,059 and Kennon U.S. Pat. No. 4,429,366.

SUMMARY OF THE INVENTION

In the communication and control system of the present invention a low cost 4 bit microprocessor is used as the common building block of the system and is programmed to function either as a central controller or as a remote load control unit, these different functions being selectable by simply grounding certain pins of the software based digital IC device. This basic unit can also function as a customer service unit in load management control subsystems to inform the customer of existing utility rates and permit him to override an existing load management schedule if he so desires. When functioning as a central controller the software-based digital IC accepts a base band data message from an associated load management terminal which includes the relative address of the central controller and a function portion corresponding to a desired function to be executed at a specific remote station. The address portion of this LMT message is then changed to the absolute address of the remote station and a corresponding carrier modulated signal is generated which includes start bits of predetermined logic value, the new address, the function of the LMT message and a BCH error checking code which is calculated based on the preceding bits of the signal and is added at the end thereof to form the complete transmission signal.

In the central controller mode the digital IC also receives a modulated carrier reply message from the addressed remote station, calculates a BCH error code from the bits of the received message and compares the calculated code with the BCH error code at the end of the end of the reply message. If no error in transmission is indicated by such comparison, the absolute address of the addressed remote station is modified to the original relative address and a corresponding unmodulated base band data message is sent back to the load management terminal which includes the reply of the addressed slave. If no reply message is received from the addressed slave, the function code portion of the original LMT message is modified to indicate no reply from the slave and is retransmitted back to the LMT.

In the remote load control mode, the digital IC receives a modulated carrier transmission signal over the power lines and calculates a BCH error code from the bits of the received message and compares the calculated code with the BCH error code at the end of the received message. If no error in transmission is indicated by such comparison, the absolute address of the remote load control device is compared with the address portion of the received message. If they are equal the function portion of the received message is decoded and a control function, such as the closing of a circuit breaker, is performed in accordance therewith. If the decoded message includes a request for a reply, a modulated carrier signal is developed by the digital IC which includes start bits of predetermined logic value, the absolute address of the remote device, the status of the controlled load, and a BCH error checking code which is calculated based on the preceding bits of the signal and is added at the end thereof before it is supplied to the common power line.

When the digital IC is employed in a carrier load control subsystem and is operated in the customer service mode, the function code includes instruction bits for controlling a plurality of indicating devices which are selectively energized to inform the customer of the then existing peak or shoulder condition of the utility load curve, this information being supplied from the utility to the residential load management terminal. In the customer service mode, the reply message which is generated includes the status of a plurality of customer controlled load switches on the customer service unit which load switches correspond to different residential loads. The reply message also includes the status of a customer controllable override switch by means of which the customer can request that the loads he selects by the customer controllable load switches be shed or restored in contravention to the then existing utility load schedule.

In accordance with a further aspect of the communication and control system of the present invention, the signals transmitted in both directions over the power line comprise an on-off keyed carrier signal in which the presence of carrier corresponds to a logic "0" and the absence of carrier a logic "1". With such an arrangement, noise on the power line is always falsely detected as a carrier tone, i.e. transforms a data "1" to a data "0". To provide improved noise immunity, each data bit includes a first carrier-on portion of predetermined duration and a second data portion in which carrier is present or absent depending upon the logic value of the data bit. In detecting each data bit the incoming carrier is sampled a number of times beginning in the middle of the carrier-on portion of the first data bit to the middle of the carrier-on portion of the next bit. If any of the samples are logic "1", i.e. absence of carrier, the data bit is treated as a "1". Only if all of the samples are "0", i.e. presence of carrier, is the data bit treated as a "0".

BRIEF DESCRIPTION OF THE DRAWINGS

The invention, both as to its organization and method of operation, together with further objects and advantages thereof, will best be understood by reference to the following specification taken in connection with the accompanying drawings in which:

FIG. 3 is a diagram of the message bit format employed in the system of FIG. 1 to transmit messages from a load management terminal to a central load controller.

FIG. 4 is a diagram of the message bit format employed to transmit carrier modulated messages to and from the central load controller to a remote unit;

FIG. 5 is a diagram of the message bit format employed to transmit a message from the central load controller to the load management terminal;

FIG. 12 is a timing diagram of a portion of the message format of FIG. 4;

FIG. 13 is a logic flow diagram showing the power up sequence employed in the controller of FIG. 2;

GENERAL DESCRIPTION OF SYSTEM

Figure 1:
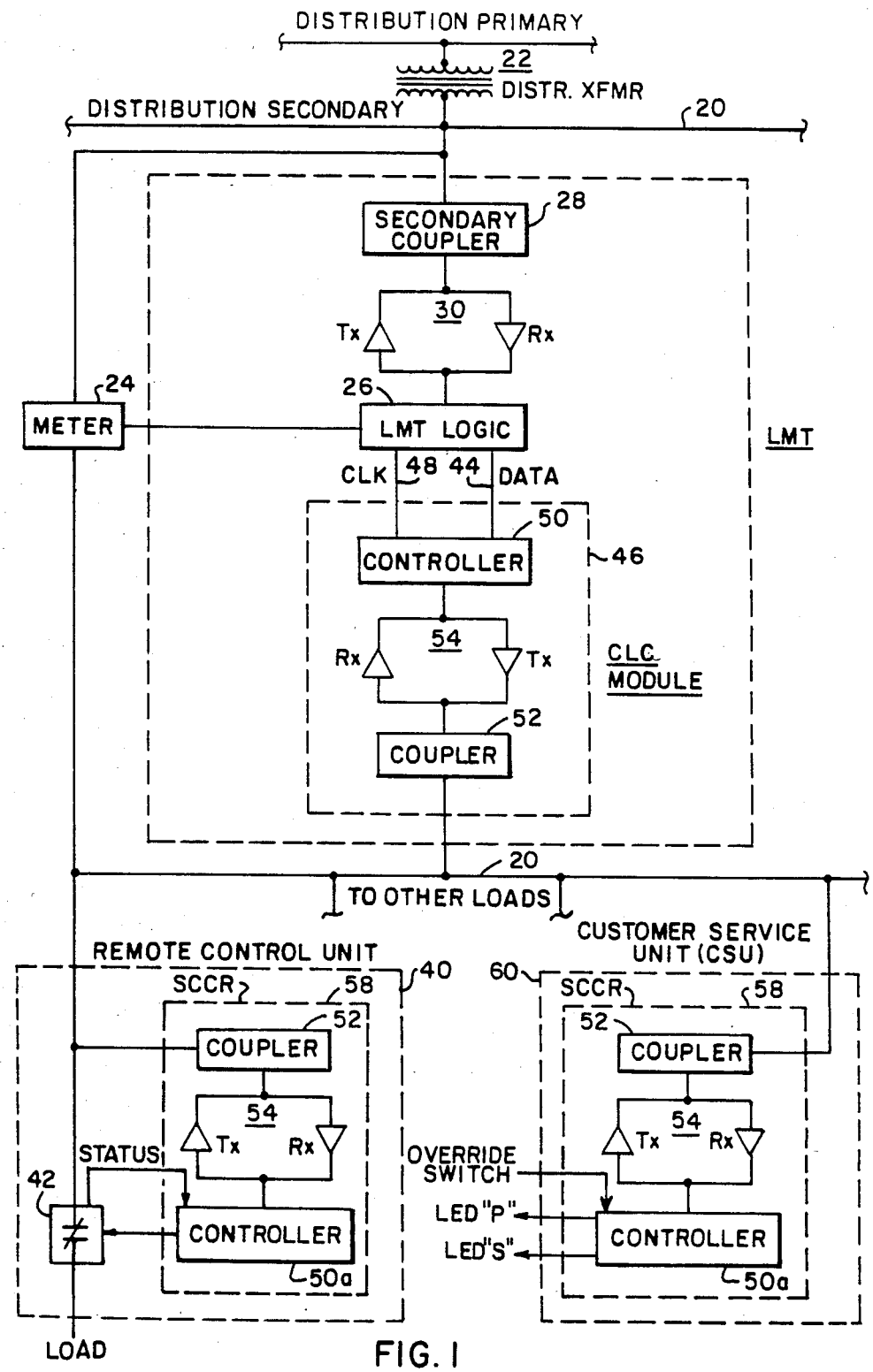
FIG. 1 is an overall block diagram of the described carrier load control subsystem.

Referring now to the drawings, and more particularly to FIG. 1 thereof, the present invention is therein illustrated in conjunction with a utility distribution network load management system. More particularly, the secondary 20 of the distribution transformer 22 is connected to a number of residences, or factories, one of which is shown in FIG. 1 as having the watt-hour meter 24. A load management terminal LMT includes suitable logic circuits indicated generally at 26, and is coupled to the distribution secondary 20 through a coupler 28 and a transmit/receive modem 30. The load management terminal LMT, which is preferably microprocessor based, is arranged to receive messages from and transmit messages to the central utility over the power distribution system. These messages may include commands to shed or restore load at any one of a number of remote stations associated with different loads in the home or factory, one of which is indicated at 40 in FIG. 1 and includes the circuit breaker 42 for controlling one of these loads from the distribution secondary. More particularly, the load management terminal 26 is arranged to develop command messages having the format shown in FIG. 1A which are supplied over a bi-directional serial data line 44 to a central load controller indicated generally at 46, under the control of the clock line 48 from the LMT 26. The central load controller (CLC) 46 includes a controller 50 which is preferably a software based digital IC which is pin configurable to operate in any one of several different modes, as described in detail hereinafter, the controller 50 being coupled to the distribution secondary through the coupler 52 and the transmit-receive modem 54. At the remote station 40 a secondary carrier controlled remote module (SCCR) is employed, this module including the controller 50a which is similar to the controller 50 but is pin configured to operate as a remote load control slave, the module 58 also including the coupler 52 and modem 54, as in the central load controller 46 module.

The load management terminal 26 is also arranged to send messages to and receive messages from the CLC 46 which are intended for a customer service unit (CSU) 60. The CSU 60 includes an SCCR module 58 which is indentical to the module 58 used in the remote station 40. However, the controller 50a of the SCCR unit at the CSU station is employed to control a pair of LED's indicated as "P" and "S" which are employed to indicate periods during which a peak load condition "P" or a shoulder condition "S" of the utility load curve is in force. The customer service unit also includes an override switch the status of which is supplied to the controller 50a to indicate the desire of the customer to override an existing load condition in selected ones of the utility controlled loads of that customer.

Figure 2:
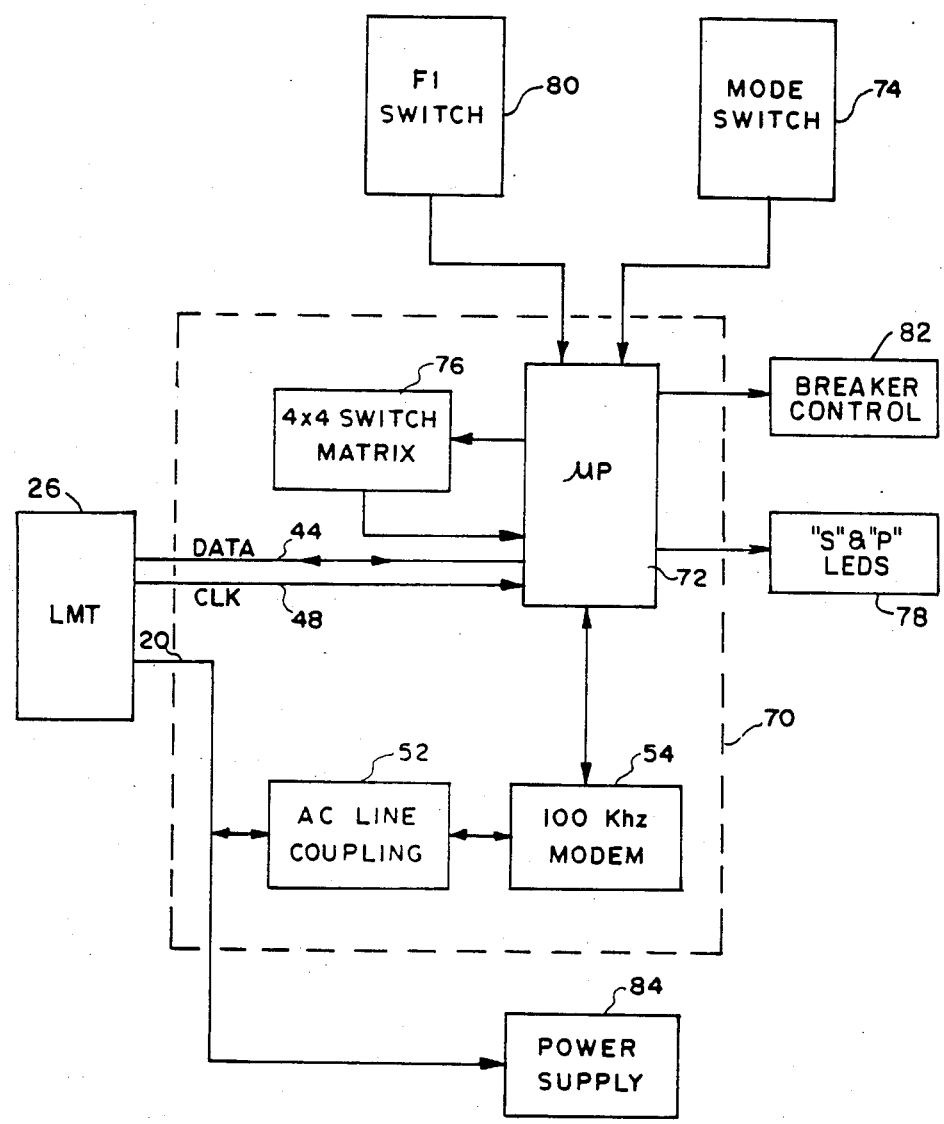
FIG. 2 is a block diagram of the multipurpose load controller employed in the system of FIG. 1.
Figure 6:
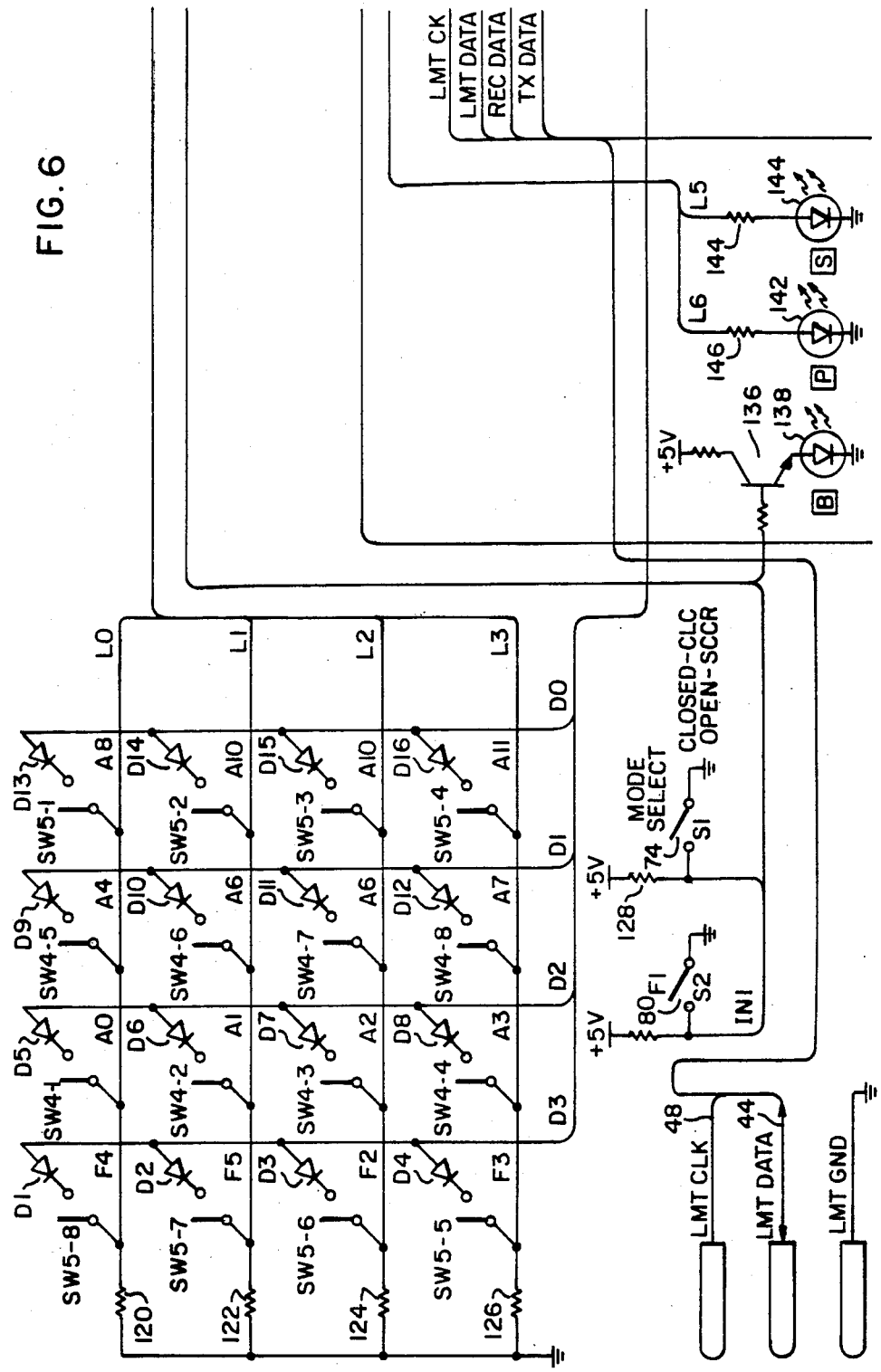
FIGS. 6 to 9, inclusive, when arranged in the manner shown in FIG. 6A, comprise a detailed schematic diagram of the multipurpose load controller of FIG. 2.
Figure 7:
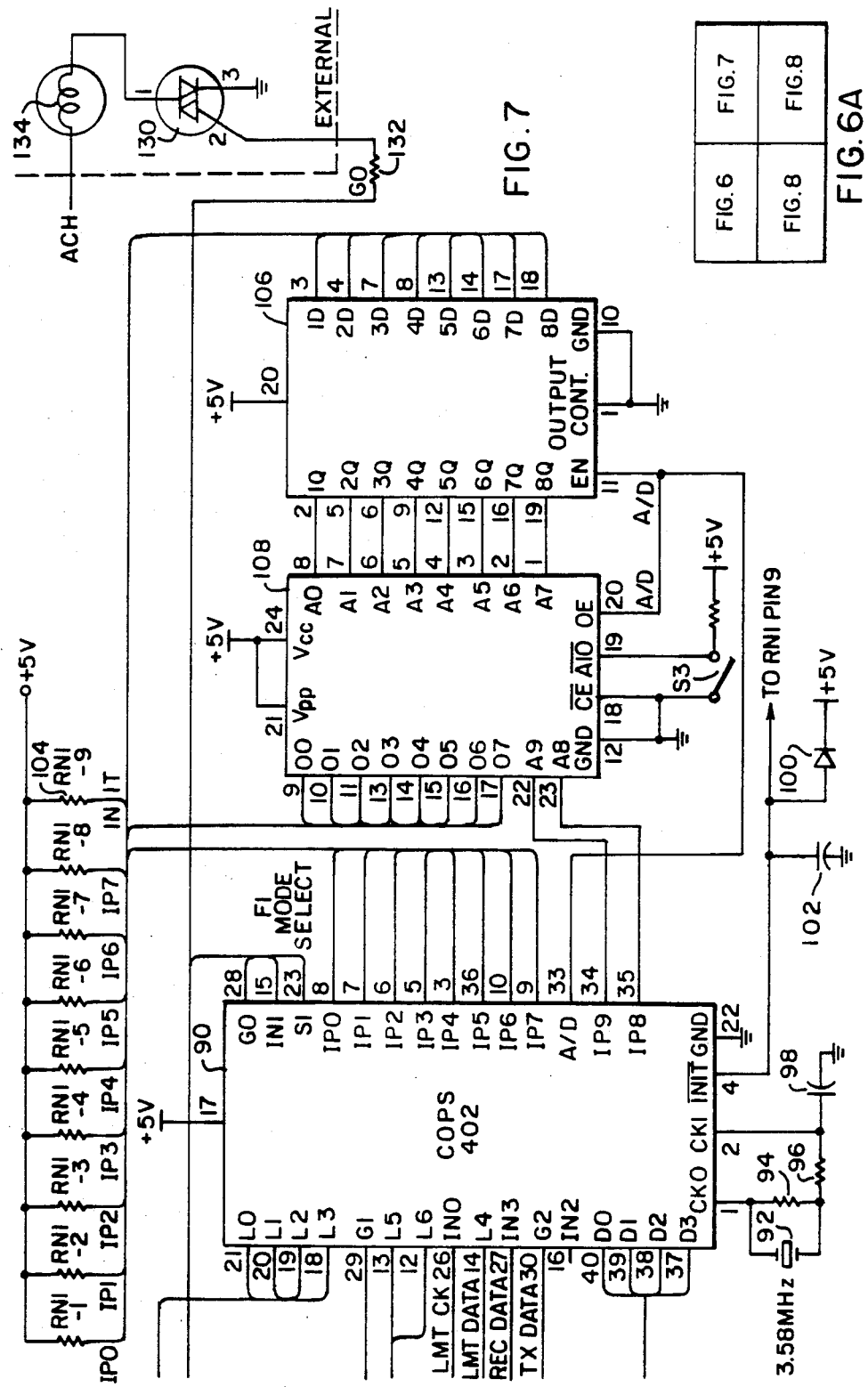
Figure 8:
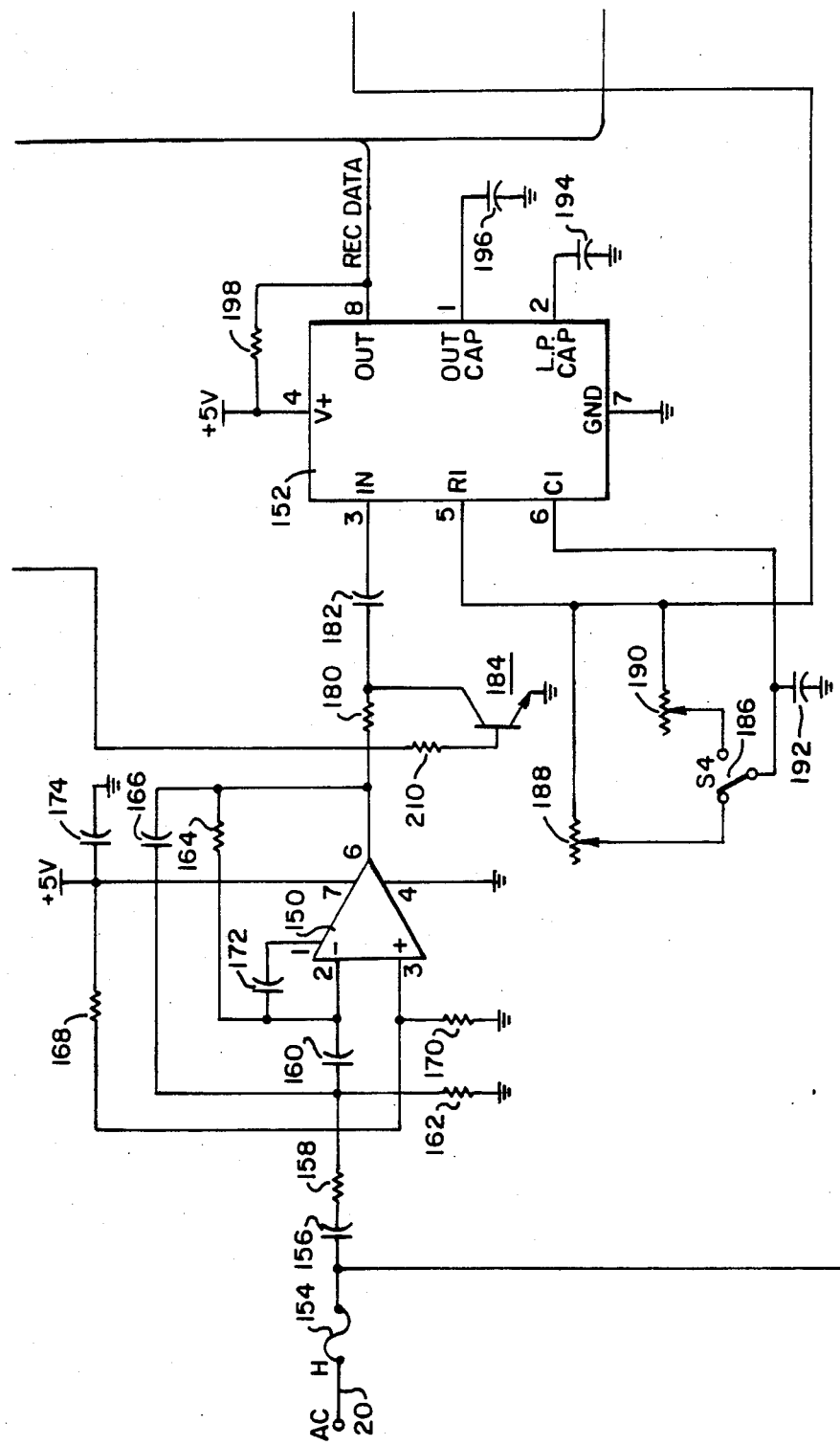
Figure 9:
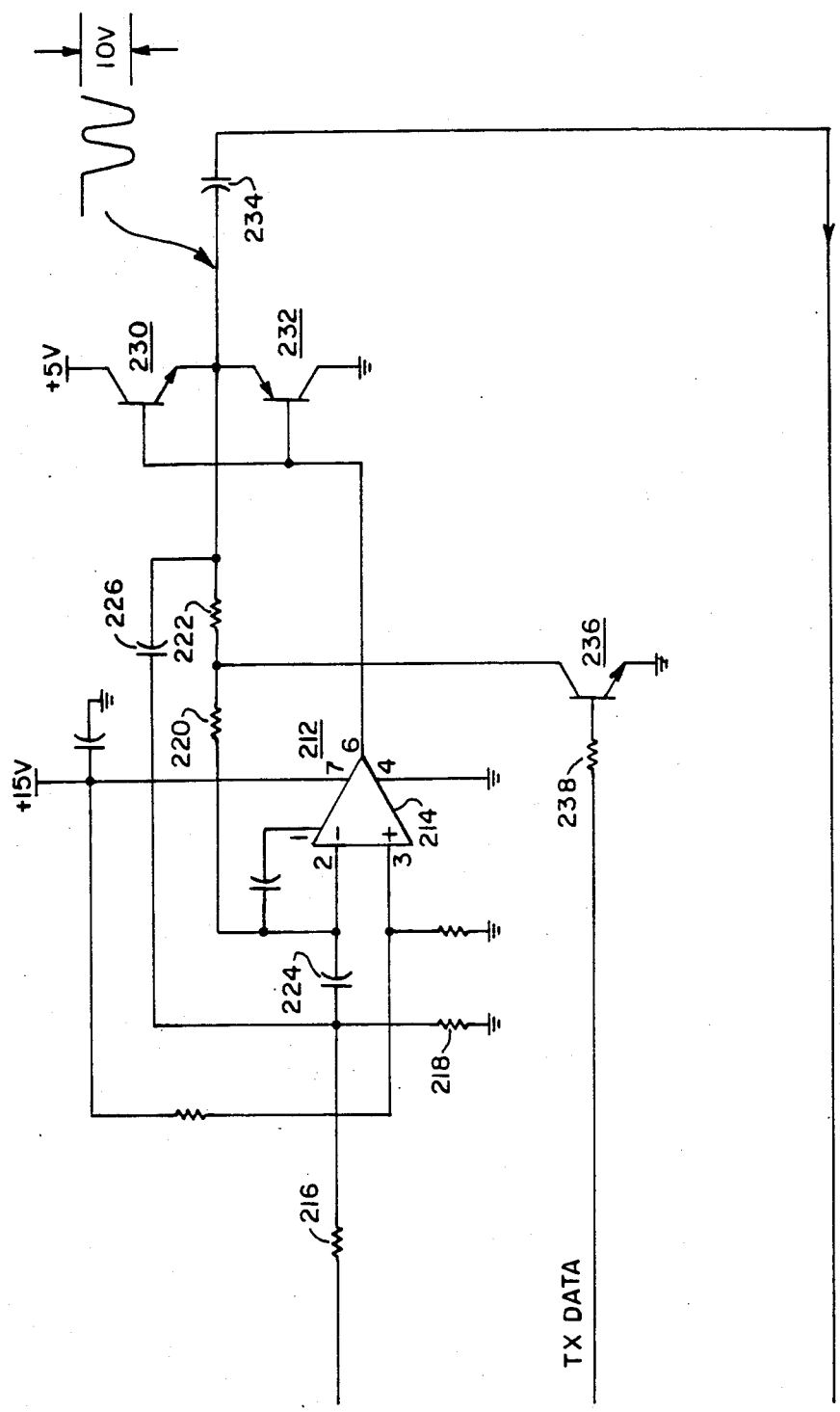

In FIG. 2 there is shown in block diagram form the basic module which, in accordance with the present invention, can be used either as the central load controller 46, the remote station SCCR 58 or the customer service unit SCCR 58 of FIG. 1. More particularly, this basic module 70 comprises a microprocessor 72 which is arranged to be controlled by the mode switch 74 so that the module 70 can function either as a central load controller (CLC) or as a slave breaker control unit (SCCR) at a remote station, or as a customer service unit. The microprocessor 72 is arranged to receive base band data messages from and transmit base band data messages to the LMT 26 over the conductor 44 under the control of the clock line 48 from the LMT 26. The microprocessor 72 also developes a modulated carrier signal which is supplied through the transmit-receive modem 54 and the AC line coupler 52 to the distribution secondary line 20. A 4×4 switch matrix 76 is provided in the module 70, 12 nodes of the matrix 76 being employed as a field configurable offset address when the module 70 is operated as a central load controller. The other four nodes of the matrix 76 are employed as customer operated load switches for four loads which may be selectively controlled by the customer when the module 70 is used as a customer service unit (CSU). When so used the microprocessor 72 also supplies signals to "S" and "P" LEDs 78 to inform the customer of the existing utility load curve and rates existing at that time. A function (F1) switch 80 is also connected to provide an input to the microprocessor 72, the switch 80 functioning as an override switch when the module 70 is employed as a customer service unit.

When the module 70 is employed in a secondary carrier controlled remote (SCCR) 40, the microprocessor 72 provides a control signal to a breaker control unit 82. Also, when the module 70 is used as an SCCR unit, the 12 nodes of the switch matrix 76 are employed as the absolute address of this remote station. In the SCCR mode of the module 70 the other four nodes of the switch matrix 76 are not utilized. A power supply 84, which is energized from the AC line 20, is employed to supply power to the elements of the module 70, as will be described in more detail hereinafter.

Considering now the general functioning of the communication and control system described thus far, the format of the messages transmitted between the LMT 26 and the master or central load controller CLC 46, and the modulated carrier messages transmitted from the master module 46 over the power line 20 to the SCCR units which are operated either to control a remotely located breaker or to serve as a customer service unit (SCU), the LMT 26 initiates communications over the carrier subsystem in accordance with instructions received from the utility over the primary carrier control system and the CLC 46 idles in a receive mode. In the idle state the clock line 48 is asserted high by the LMT 26 and a valid data bit is present on the serial data line 44 when the LMT 26 causes the clock line to make a high-to-low transition. Additional data bits follow on subsequent clock high to low transitions until the message from the LMT 26 to the CLC 46 is completed. The period of the clock line 46 is from four milliseconds minimum to 1.0 seconds maximum for each state (either high or low). In the event that prior to the completion of a message in progress, the CLC 46 finds the clock period to exceed the 1.0 second maximum, the CLC 46 immediately reverts back to the idle state waiting for a new command word from the LMT 26. After the LMT 26 sends a command word, it delays the clocking in of the reply word from the CLC 46 for a minimum of 3.0 seconds and a maximum of 15.0 seconds. For delays greater than this maximum time, the CLC 46 immediately reverts back to the idle state waiting for a new command word.

The format of the LMT to CLC message is shown in FIG. 3 and consists of 22 bits, the first two bits being start bits having logic values "0" and "1" respectively. The start bits are followed by a 12 bit SCCR relative address and an 8 bit function code. The 12 bit SCCR relative address comprises the actual address of the slave, or CSU for which the message is intended minus an offset address which is field programmable by the switches in the switch matrix 76 so as to provide a hardware settable offset (modulo 4096) of the targeted SCCR.

In the 8 bit function code of FIG. 3 the numbers 0–3 and 8–255 are unused although they may be interpreted as a "send status" command, if desired. The 8 bit function code has different meanings depending upon whether the command message from the LMT 26 is intended for an SCCR operating as a breaker control, or an SCCR operating as a customer service unit (CSU). Considering first the active numbers of the 8 bit function code, when intended for a breaker unit function code number 4 commands the addressed slave to close the associated circuit breaker and send the status thereof back to the central load controller 46. Function code number 5 commands the SCCR to open the circuit breaker, disable a 12 minute timer and second status. Function code number 6 commands the addressws slave to open the associated circuit breaker, enable a 12 minute timer and send status. Function code number 7 requires no operation by the addressed slave but merely commands it to send the existing status of the circuit breaker.

Considering the 8 bit function code when sent to a customer service unit (CSU), function code number 4 commands the CSU to turn both the "S" and "P" LEDs 78 off and send the status of four customer load switches associated with loads A, B, C and D and the state of the customer override switch 80 (FIG. 2). These four load switches are the first four consecutive bit addresses identified in the 16 bit switch matrix 76. Function code number 5 commands the CSU to turn the "P" LED off, turn the "S" LED on and send the status of the customer load switches and the customer override switch. Function code number 6 commands the CSU to turn the "P" LED on, turn the "S" LED off and send the status of the customer load switches and customer override switch. Function number 7 commands no operation by the CSU but merely requests that it send status back to the LMT 26.

Upon receipt of a command from the LMT 26, CLC 46 adds its 12 bit address offset to the 12 bit SCCR relative address of FIG. 3 to provide the 12 bit SCCR absolute address. The CLC then develops a modulated carrier message of the format shown in FIG. 4. Refering to this figure, the first start bit of "0" consists of a carrier on interval followed by a "1" start bit in which the carrier is turned off. The carrier is then modulated in accordance with the 12 bit SCCR absolute address and the 8 bit function code shown in FIG. 4. As these bits are being transmitted, the CLC 46 also computes a 6 bit BCH error code for the message which is being transmitted from the CLC to the designated SCCR over the power line, this 6 bit BCH error code being added at the end of the modulated carrier signal as shown in FIG. 4. Preferably, this BCH error code is calculated from first bit to last using the root polynomial $X^6 + X^5 + 1$.

The modulated carrier message shown in FIG. 4 is impressed upon the power line 20 through the coupler 52 of the central load controller 46 and is received by all of the SCCR units 58 connected to the line 20. Each SCCR unit compares its absolute address with the 12 bit SCCR absolute address of the received message. If these addresses compare equally the addressed slave SCCR unit then calculates its own BCH error code based on the bits of the received message preceding the final 6 bit BCH error code thereof and compares it with the last 6 bits of the received message. If the calculated BCH error code is equal to the received message BCH bits the SCCR then executes the commanded function. Thus, if the addressed SCCR is a breaker unit and the function code is number 4 the SCCR closes the breaker contacts 42 (FIG. 1). If the function code is number 5 the SCCR unit opens the breaker and disables a 12 minute timer. If the function code is number 6 the breaker contacts 42 are opened and a 12 minute timer is enabled at the end of which the breaker contacts are closed.

If the addressed SCCR is a customer service unit and the function code is number 4 both the "S" and "P" LEDs 78 are turned off. If the function code is number 5 the "P" LED is turned off and the "S" LED is turned on and vice versa if the function code is number 6.

After the commanded function has been executed the addressed SCCR assembles a reply message which consists of the 0, 1 start bits of FIG. 4, the 12 bit SCCR absolute address and an 8 bit status reply in place of the 8 bit function code which was sent from the CLC 46 to the addressed SCCR. The addressed SCCR also computes a 6 bit BCH error code which is added to the end of the reply message, this reply message being modulated on a carrier and transmitted over the power line 20 back to the CLC 46.

The CLC 46 receives the status reply message of FIG. 4 and computes its own 6 bit BCH error code which is compared with the last 6 bits of the status reply message. If the two BCH error codes compare equally, the CLC assembles a message to be transmitted to the LMT 26, in the format shown in FIG. 5. More particularly, referring to FIG. 5 the 12 bit SCCR absolute address of FIG. 4 is modified to subtract the address offset assigned to the CLC module 46 and the 8 bit SCCR status reply is added thereto and sent to the LMT as a base band message. The 8 bits of the status reply are identified as bits $F_7$-$F_0$, the $F_0$ bit being the last bit sent in the SCCR-LMT reply message. If, during the initial transmission of a modulated carrier signal from the CLC 46 to the addressed SCCR, no reply message was received from the SCCR, the CLC 46 sets the $F_7$ bit to 1 and maintains the bits $F_6$-$F_0$ with the same logic values as the corresponding function bits in the command message shown in FIG. 3.

If, on the other hand, the addressed SCCR receives the message and assembles a reply message the status reply $F_7$ will be zero. Assuming that the addressed SCCR is associated with a customer service unit (CSU) the $F_6$ status reply bit is unused. The status reply bits $F_5$-$F_2$ are set in accordance with the states of the CSU customer load switches A, B, C, and D, it being recalled that these switches comprise four switches of the matrix 76. The $F_1$ status reply bit represents the state of the customer override switch 80 (FIG. 2) and the $F_0$ status bit is unused by the CSU unit. Assuming that the addressed slave is associated with a circuit breaker, the status bits $F_6$-$F_1$ are unused. The $F_0$ status reply bit is a 0 if the circuit breaker is closed and a "1" if the circuit breaker is open.

System Hardware

Considering now the hardware employed in the communication and control system of the present invention, and referring to FIGS. 6-9, inclusive, the controller 50 (FIG. 1) comprises a microprocessor 90 which is preferably a commercial type COPS 402 microprocessor manufactured by National Semiconductor Inc., or equivalent. All logic functions of the multipurpose module of FIGS. 6-9, are carried out by the microprocessor 90. In the illustrated embodiment the microprocessor 90 is customized through a use of the memory chip 108 and an address latch 106. With the specific ROM code set forth below in Appendix A, the microprocessor 90 is transformed into a customized multipurpose unit which can perform all of the necessary functions to provide both master and slave units in the communication and control system of the present invention.

The microprocessor 90 is controlled by a 3.58 MHz crystal 92 for accurate repeatable time interval measurements. Resistors 94 and 96 and capacitor 98 bias the crystal for proper oscillator operation. The initialization circuit of the microprocessor 90 comprises the diode 100, the capacitor 102 and a 4.7K ohm pullup resistor 104. With this external circuit arrangement the initialization input signal is delayed by the RC time constant so that the power supply 84 (FIG. 2) has time to stabilize before the microprocessor 90 begins operation.

Lines IP-0 through IP-7 of the microprocessor 90 are bidirectional address/instruction data lines. In the illustrated embodiment an address latch 106 is employed together with a programmable read only memory chip 108, the address latch 106 being preferably of the commercial type 74C73 and the memory chip 108 a commercial type 2716, manufactured by Intel Inc. For proper operation of the address latch 106, the lines IP-0 through IP-7 of the microprocessor must be pulled up by the pull up resistors RN1-1 to RN1-8. The output of the address latch 106, plus the lines IP-8 and IP-9 of the microprocessor 90 and the switch S3 form the address to the PROM 108. While the addressing range of the microprocessor 90 is only 1K bytes, and the PROM 108 has 2K bytes of memory, only one-half of this memory is used at a time, either the upper of lower 1K. The switch S3 is used to select which half of the PROM 108 the microprocessor 90 will address. With switch S3 closed, the lower half is selected which contains the operational program for providing both master and slave functions for the microprocessor 90, depending upon the position of the mode select switch 74, as discussed in detail heretofore. With the switch S3 open, the upper half of the memory 108 is selected which may contain a test program used to set up and check both the CLC module and the overall system operation. The A/D line of the microprocessor 90 is used to latch the address into the PROM 108 and enable the instruction to be output from the PROM 108 to the microprocessor 90. If desired, the microprocessor 90 may comprise a COPS 420 type microprocessor which has 1K of internal programmable read only memory, preferably mask programmable, in which case the address latch 106 and the PROM 108, together with the pull up resistors RN1-1 to RN1-8 are not required.

The 4×4 switch matrix 76 is comprised of a series of address switches SW4-1 to SW4-8 and SW5-1 to SW5-8 which are preferably single pole single throw switches in a dual in line package. Any given address bit is set to a "1" by closing the proper switch. The 12 address switches SW4-1 to SW4-8 and SW5-1 to SW5-4 are employed to establish the address of the controller, when operated in either the master or slave mode. In connection with the CLC module 46, these address switches establish the address offset which is added to the LMT message to provide the absolute address of the desired slave. in the case of the SCCR units, these address switches establish the absolute address of the remote station or customer service unit.

The four switches SW5-5 to SW5-8 are customer operable switches which correspond to four different loads of the residence or factory, identified as loads A, B, C and D which may be selectively controlled by the customer through the customer override switch 80. These four customer operable switches are combined withe the twelve address switches to form a 4×4 matrix which simplifies scanning of all of these switches by the 4 bit microprocessor 90. More particularly, the matrix 76 is scanned by a common row, column method by which the signal lines L0–L3 are row output lines from the matrix. These lines are pulled down to a low logic level by resistors 120, 122, 124 and 126. Lines D0–D3 are column input lines to the matrix. The matrix is scanned by setting 1 (and only 1) of the D lines high to a logic "1". This selects the column to which this D line is connected for reading. Any switch which is closed in that selected column will connect the D line to an L line bringing that line high. Thus, the L lines will be high wherever there is a switch closure. Since each switch has a unique row-address, all four switches in a particular column, which are closed, can be identified by successively reading the L lines.

Figure 10:
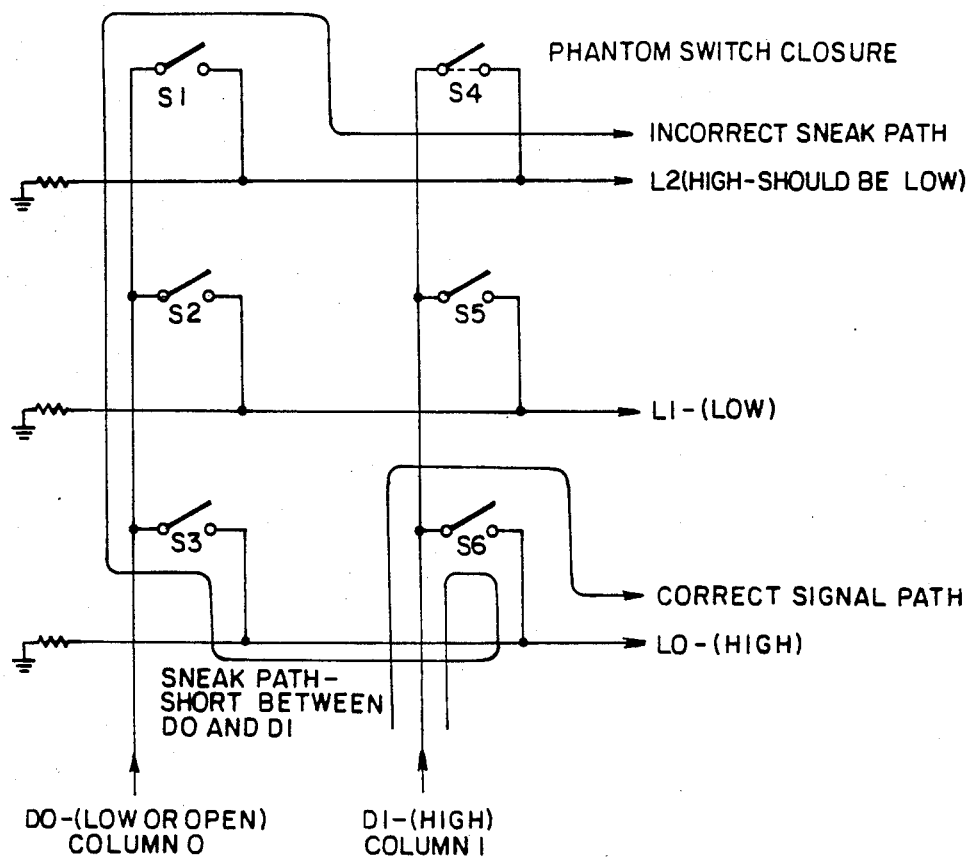
FIG. 10 is a circuit diagram of a portion of the switch matrix employed in the controller of FIG. 2 and shown without back-biased diodes to illustrate how incorrect signal paths may be generated.

Diodes D1–D16 are used to prevent "phantom" switch closures from appearing on an L line, when the switch for that selected row is open. Without the diodes D1–D16, sneak paths could appear since the switches are always open or closed, as opposed to a keyboard where the switches are normally open and are only momentarily closed. Also, without the diodes D1–D16 the D lines are shorted together. This is readily apparent by reference to FIG. 10 wherein a portion of the matrix is shown without the diodes D1–D16. Referring to this figure, when column 1 is selected, only S6 is closed and L0 is the only matrix output line that should be high. However, assuming that S1 and S3 are also closed in an assumed address, when S3 in column 0 is closed, matrix column input line D0 is connected (shorted) to line D1 through switches S3 and S6. Assuming that line D0 does not have sufficient drive to pull line L0 low, then line D0 will also be high. Since switch S1 is closed and D0 is now high, output line L2 is also high. Reading the L lines, it appears as if S4 and S6 are closed in column 1, while in actually only S6 is closed. The S4 closure is a "phantom closure". If the D0 line does have sufficient drive to pull line D1 low, then line L0 will be low because of the S3 closure between D0 and L0. In this case, no switch in column 1 will be read as closed, since D1 can never go high to drive any L line high.

Figure 11:
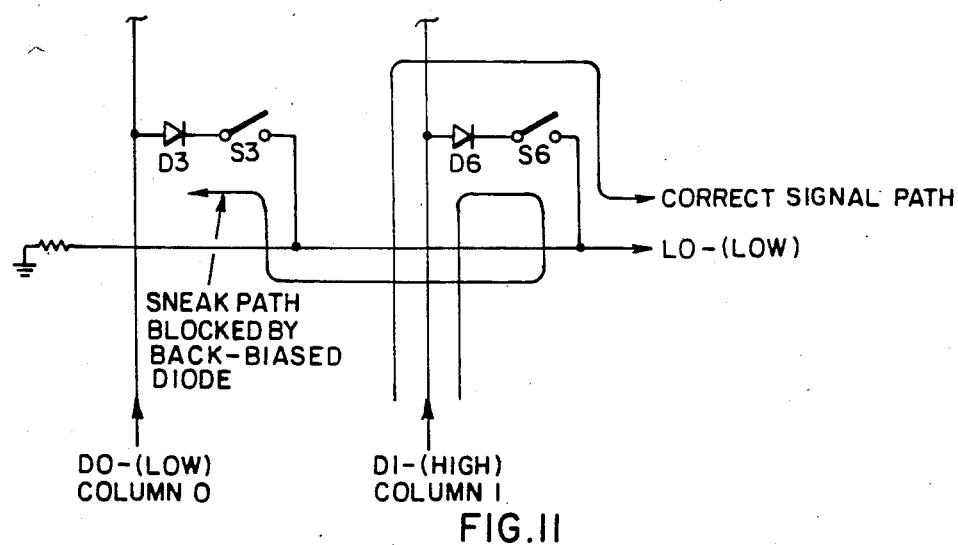
FIG. 11 is a circuit diagram similar to FIG. 10 but shown with the diodes included.

FIG. 11 illustrates how the diodes D1–D16 prevent the above described sneak paths from occurring. When D1 drives L0 high through the closure of S6, D0 cannot be driven high, or D1 cannot be shorted low (depending on the drive capabilities of D0) because diode D3 being reverse biased acts as an open switch. Thus, no sneak paths and the related phantom switch closures can occur.

When the mode select switch 74 is closed the input line S1 to the microprocessor 90 is low, which informs the microprocessor 90 that the unit should operate as the master or central controller i.e. the CLC module 46 of FIG. 1. When the switch 74 is open, the line S1 is pulled high through the resistor 128 which causes the unit to operate either as an SCCR module 40 or a customer service unit 60 depending upon the external components connected thereto. More particularly, if the unit is to operate as a breaker control SCCR unit the G0 output line of the microprocessor 90 is supplied to the gate electrode of an external triac 130 through the resistor 132. The output of the triac 130 controls a relay coil 134 so as to cause the appropriate circuit breaker contacts to open or close. The G0 signal is also applied through the transistor 136 (FIG. 6) to an LED 138 so that this LED is energized during periods when the relay coil 134 is energized.

In the case of a customer service unit, the L5 and L6 lines of the microprocessor 90 are employed to energize the "S" LED 140 and the "P" LED 142 through the resistors, 144 and 146, respectively, the lines L5 and L6 being controlled in accordance with the function code of the message transmitted from the LMT 26, as described in detail heretofore. When the microprocessor 90 is functioning in the customer service unit mode, it also samples the four customer operable switches SW5-5 to SW5-8 to determine the state of these switches, this data being incorporated in the status portion of the reply message (FIG. 4) which is transmitted over the power line 20 back to the CLC module 46 and through this module to the LMT 26. The status of the customer override switch 80 is also read by the IN1 line of the microprocessor 90 and is incorporated in the F1 status reply bit (FIG. 5) of the reply from the customer service unit through the module 46 to the LMT 26.

Considering now in more detail the transmitter/receiver 54 and coupler 52 in the multipurpose module shown in FIGS. 6 to 9, which can function as either the module 46 or the module 58 in FIG. 1, the receiver portion of this unit comprises a preamplifier 150 and a phase lock loop receiver 152. Preferably the preamplifier is an operational amplifier of commercial type LM101 and the phase lock loop circuit is a commercial type NE567. The modulated carrier signal which is supplied to the AC power line 20 from the CLC module 46 and intended for one of the remote stations 40, is coupled through a nichrome link 154, a capacitor 156, a resistor 158 and a capacitor 160 to the inverting input of the operational amplifier 150. A resistor 162 is connected from the junction of the resistor 158 and the capacitor 160 to ground to provide a voltage divider, the resistors 158 and 162 preferably being 1% resistors and having the values of 750 ohms and 267 ohms, respectively.

The preamplifier 150 is operated as a pass band amplifier and is designed to have a low frequency cut off of 95 Khz, a high frequency cut off 125 Khz and a peak gain of 7. A feedback resistor 164 is connected from the output of the preamplifier 150 to its inverting input, the resistor 164 preferably having a value of 10.5 kilohms and a 1% tolerance. A feedback capacitor 166 is connected from the output of the preamp 150 to the junction of the resistors 158 and 162, the capacitors 160 and 166 each having a value of 0.001 microfarad. The resistors 158, 162 and 164 and the capacitors 160 and 166 form a feedback network around the preamplifier 150 so as to provide the desired frequency response and the gain of 7 in this preamplifier stage increases the overall input sensitivity of the module. Resistors 168 and 170 are employed to bias the DC output level of the preamplifier 150 to 2.5 volts which is half way between the supply voltage inputs to the amplifier. Thus, when a modulated carrier signal is applied from the power line 20, a full sinusoidal output appears at the output of the preamp 150. A capacitor 172 is used to stabilize the preamplifier 150 and preferably has a value of 120 picofarads. The filter capacitor 174 is employed to remove any undesired noise components in the five volt power supply. Since the preamplifier 150 drives the phase lock loop circuit 152 which also is energized by a +5 volt supply, the signal input to the phase lock loop circuit 152 is prevented from exceeding the supply voltage of the phase lock loop circuit 152 by running the preamplifier 150 from the same 5 volt power supply.

Considering now the phase lock loop circuit 152, the output of this integrated circuit becomes active low whenever there is an input signal of the proper frequency and at least a 100 millivolt level is supplied from the preamplifier 150. The phase lock loop circuit 152 has its own oscillator section which is used as an internal reference. This oscillator is also used as an input to the transmitter portion of the module, as will be described in more detail hereinafter. The output signal from the preamp 150 is coupled through the resistor 180 and the capacitor 182 to the IN line of the phase lock loop circuit 152. A transistor 184 is employed to switch the junction of the resistor 180 and the capacitor 182 to ground when the microprocessor 90 is in a transmitting mode so that there will not be any input signal from the power line 20 on which the phase lock loop circuit might try to lock during the transmission mode. The phase lock loop circuit oscillating frequency, or "center frequency" is determined by the RC network connected to pins 5 and 6 of the phase lock loop circuit 152. However, in accordance with a further aspect of the invention, the multipurpose module shown in FIGS. 6–9, is arranged to operate on either one of two carrier frequencies which may be selected by means of the switch 186. Accordingly, if the utility carrier control system is operating on one of these frequencies, the other frequency may be selected so as to provide selectivity against receiving the utility signal when it is being transmitted over the same power line. Also, in the event that both commercial control of loads in a residence or factory, is desired in addition to a utility load control system, the modules employed for the utility load control subsystem may employ one operating frequency and the commercial system can employ the other operating frequency. A control console coupled to the AC line will then be able to communicate with both types of components by switching between the two carrier frequencies, if desired.

More particularly, a potentiometer 188 is connected from one of the contacts of the single pole double through switch 186 to pin 5 of the phase lock loop circuit 152 and a potentiometer 190 is connected from the other contact of the switch 186 to this terminal. A capacitor 192 is connected from the common arm of the switch 186 to the input terminal 6 of the phase lock loop circuit 152. The two carrier frequencies may thus be selected by actuation of the switch 186 and the corresponding one of the potentiometers 188 or 190 adjusted to provide the exact desired center frequency. Preferably, the potentiometers have a resistance of 10,000 ohms each and the capacitor 192 has a value of 0.0047 microfarads. Preferably the potentiometer 188 is adjusted for a center frequency of 107 Khz and the potentiometer 190 is adjusted for a center frequency of 117 Khz. A capacitor 194 is connected to pin 2 of the phase lock loop circuit 152 to control the dynamic response characteristic of the phase lock loop. A capacitor 196, which is connected to pin 1 of the phase lock loop circuit 152 filters the output voltage of the phase lock loop portion which is supplied to its internal voltage comparator. The open collector output of the phase lock loop circuit 152 at pin 8 thereof is pulled up to five volts through the resistor 198 so as to generate the appropriate TTL input level of signal for the microprocessor 90. The incoming carrier signal on which the circuit 152 is locked, is transmitted to the receive data input line 27, (IN3) of the microprocessor 90 and the demodulation of the data bits of the received message is accomplished by the module software, as will be described in more detail hereinafter.

The transmitter portion of the multipurpose module shown in FIGS. 6 to 9, inclusive, utilizes the center frequency oscillator signal developed in the phase lock loop circuit 152 as an unmodulated carrier signal which is then modulated in accordance with the data bits of the modulated carrier message format shown in FIG. 4 which are developed by the microprocessor 90. More particularly, when it is desired to transmit a modulated carrier message onto the power line 20, the microprocessor 90 develops an enabling signal on its G1 line (pin 29) which is supplied through the resistor 210 to the base of the transistor 184 so as to turn this transistor on and ground the junction of the resistor 180 and the capacitor 182 so that no received signal which is amplified by the preamplifier 150 is permitted to enter the phase lock loop circuit 152. As a result, the oscillator portion of this circuit operates at its center frequency and the 5 volt square wave output which is developed at pin 5 of the circuit 152 is supplied to an amplifier circuit indicated generally at 212 which includes the operational amplifier 214 which is configured as a pass band amplifier and is of the commercial type LM101. This amplifier also has low and high cut off frequencies of 95 Khz and 125 Khz, respectively, but has a gain of only 2. Resistors 216, 218, 220 and 222 and capacitors 224 and 226 form the feedback network for this response. The resistor 216 preferably has a value of 2.67 kilohms, the resistor 218 a value of 215 ohms, and the resistors 220 and 222 each have a value of 5.3 kilohms. The capacitors 224 and 226 each have a value of 0.001 microfarads.

The output of the operational amplifier 214 is connected to the base electrodes of a push pull pair of transistors 230 and 232, preferably commercial types 2N5192 and 2N5193, respectively, the emitters of which are connected through the capacitor 234 to the AC line 20. These emitters are also connected to the feedback portion of the amplifier 212. The push pull transistors 230, 232 are employed to increase the current capability of the operational amplifier 214 in driving the low impedance power line 20. The collector of a transistor 236, which is preferably of the commercial type 2N3904, is connected to the junction of the resistors 220 and 222 and its emitter is connected to ground. The transistor 236 is used to key the transmitter on and off for data transmission. With transistor 236 turned on the DC feedback path around the operational amplifier 214 is broken with the effect of turning this amplifier into a comparator. This causes the output of the operational amplifier 214 to saturate at its highest output level. When a data "0" is to be transmitted, the transistor 236 is turned off allowing the amplifier 214 to function normally as an amplifier and thus impressing the buffered phase lock loop center frequency onto the power line 20. The transistor 236 is controlled by the TX data signal developed at pin 30 of the microprocessor 90 which is supplied through the resistor 238 to the base of the transistor 236. The effect of the described transmitter circuit is to shape the five volt square wave from the phase lock loop circuit 152 into a 10 volt peak to peak sine wave which can be transmitted substantial distances over the AC power line 20.

Carrier Modulation System and Logic

As described generally heretofore, the communication and control system of the present invention employs an on-off keyed carrier type of system for transmitting messages between the CLC module 46 and the SCCR units 58, over the power line 20. The presence of carrier on the power line 20 is denoted as a logic "0" start bit, or data bit, whereas the absence of carrier denotes a logic value of "1". With such an arrangement the noise impulses on the power line 20 always evidence themselves as a falsely detected carrier tone in which a data "1" is transformed to a data "0". These noise pulses vary in width from approximately 10 microseconds to about 300 microseconds ($\frac{1}{6}$ of a bit time). In the microprocessor 90 the crystal frequency of 3.58 MHz is divided by 16 to provide instruction cycles which have a duration of 4.47 microseconds. Each bit time is made to have a duration of 400 instruction cycles or 1788 microseconds, which provides a baud rate of approximately 560 bits per second. Thus, as shown in FIG. 12, each of the modulated carrier messages transmitted between the modules 46 and 58 comprise a first start bit of 0, which has a duration of 400 instruction cycles during which carrier is impressed upon the power line 20. The second start bit has a logic value of "0" for 200 instruction cycles and then a logic value of "1" for 200 instruction cycles during which no carrier is present on the power line 20. In order to provide maximum noise immunity, the microprocessor 90 is programmed to detect the rising edge of the last half of the second start bit, indicated by the letter C in FIG. 12, which corresponds to the termination of carrier on the power line 20 at the end of the first half of the second start bit. Since there is no carrier signal continuously present on the power line, each date bit transmitted is also prefaced by a "0" initial portion which lasts for 200 instruction cycles after which the data bit is transmitted for the remaining 200 instruction cycles. Thus, referring to FIG. 12, the first bit time of 400 instruction cycles is divided up into a first initial portion of 200 instruction cycles during which carrier signal is impressed upon the power line (a logic "0" portion) followed by a second portion of 200 instruction cycles during which data bit 1 is transmitted. If this data bit is a "1" there will be no carrier transmitted during these 200 instruction cycles. On the other hand, if the first data bit is a "0" carrier will continue to be impressed upon the power line 20 for the full 400 instruction cycles of the first bit time.

After the microprocessor 90 has synchronized to the incoming message on the rising edge of the second start bit "1", it then anticipates the location of the data bits and when a data bit is expected 22 samples are taken of the incoming carrier signal beginning with the middle of the "0" portion of the first bit and extending into the middle of the "0" portion of the second data bit. More particularly, as shown in FIG. 12, the sampling period starts at point A which is midway in the initial 200 instruction cycles during which carrier is impressed upon the power line 20, and ending at point B which is in the middle of the "0" carrier-on portion of the second data bit. The sampling period thus extends from a carrier on portion of the first bit through the data bit portion and into the carrier on portion of the second bit. If any of the samples taken during the sampling period are "1" i.e. absence of carrier, then the data bit is treated as a "1". Only if all of the samples are "0" i.e. carrier is present, is the data bit treated as a "0". The time from point A to point B in FIG. 12 is 393 instruction cycles. At time B+ 7 cycles the sampling period for the second data bit is started, and so forth. If the first data bit is a "1" then noise impulses must mask the entire data bit of 200 instruction cycles so that none of the samples are "1" in order for the data bit to be falsely interpreted. On the other hand, if the first data bit is a "0", in which carrier is present on the power line 20, noise impulses will simply be interpreted as "0" samples and the data bit will be treated as a "0". The software program in Appendix A is specifically designed to provide 22 samples during each total bit time as measured from the leading edge C of the positive portion of the second start bit, the number 22 being chosen because it was the maximum number of times the sampling routine could be repeated in the specified bit time. Obviously, the number of samples may vary with different bit times and the running time of a particular subroutine.

In FIG. 13 the logic flow of the power up sequence of the microprocessor 90 is shown. In this power up sequence the microprocessor 90 initializes the hardware, reads in its device address, and enters the specified operating mode i.e. either the CLC mode of the module 46 or the SCCR mode of the modules 40 and 60. The microprocessor 90 remains in the selected mode unless a full hardware restart is performed.

Figure 14:
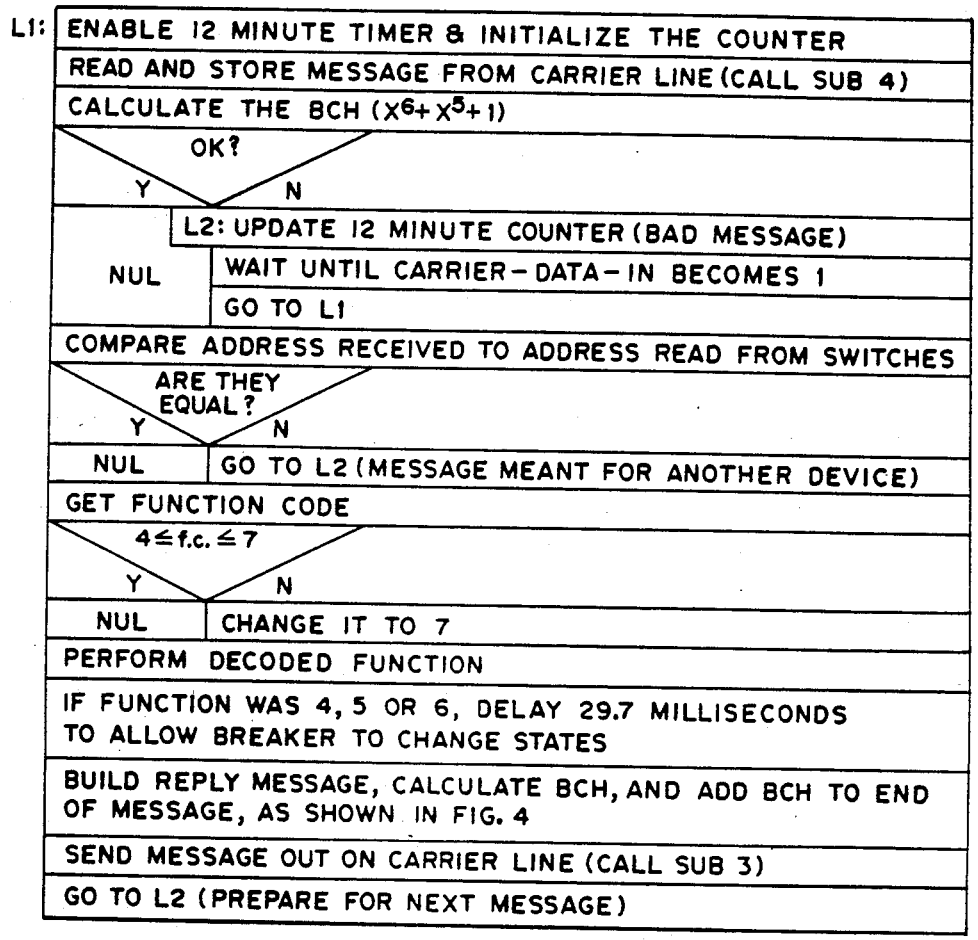
FIG. 14 is a logic flow diagram showing the operation of the controller of FIG. 2 in an addressed slave mode.
Figure 15:
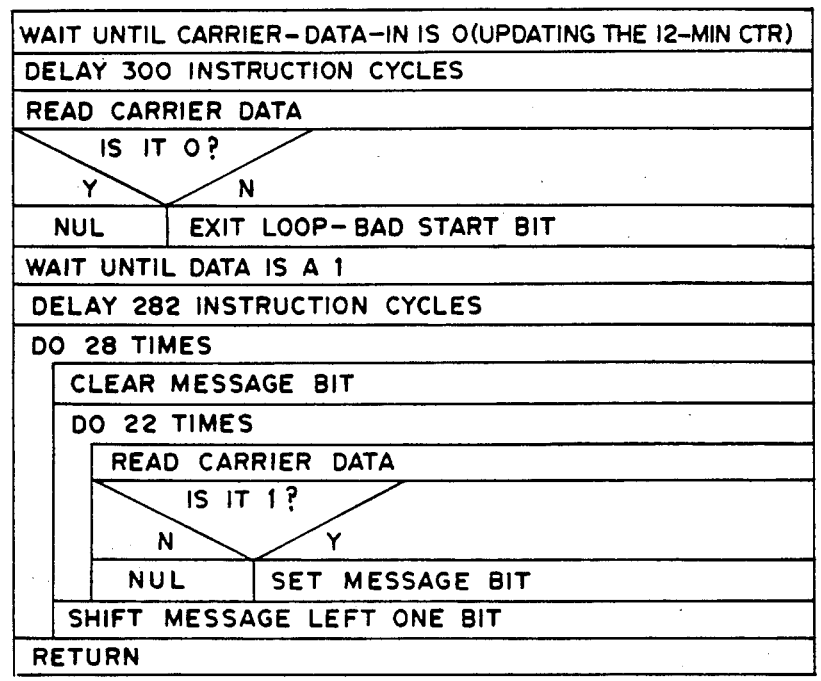
FIGS. 15 and 16 are flow diagrams of subroutines employed in FIG. 14.
Figure 16:
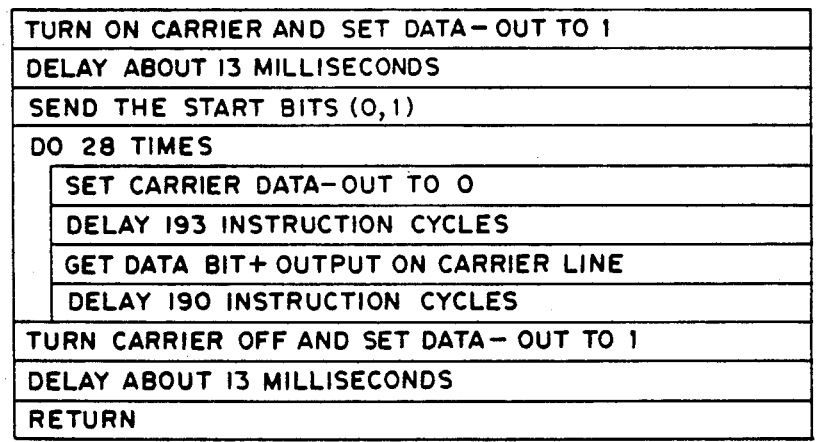

In FIG. 14 the logic flow of the microprocessor 90 when operating in the SCCR mode is shown. When a message is read from the carrier line the subroutine No. 4 (sub 4), shown in FIG. 15, is called. When a message is transmitted out on the carrier line the subroutine number 3 (sub 3), shown in FIG. 16, is called. From FIG. 4 it will be seen that messages transmitted in both directions over the power line 20 comprise 28 bits including the 2 start bits, a 12 bit SCCR absolute address, an 8 bit function or status group, and a 6 bit BCH error code. However, in order to simplify the coding of the subroutine No. 3 shown in FIG. 16, a total of 30 bits are transmitted and the last two bits are ignored by the receiving device. In a similar manner the subroutine No. 4 shown in FIG. 15, which reads the message from the carrier line in both the SCCR mode and the CLC mode, reads 30 bits but the last two bits are ignored.

With regard to the first line of the logic flow in the SCCR mode shown in FIG. 14, it is pointed out that a flag is kept which reflects the state of the breaker or "B" bit which is developed on the G0 output line (pin 28) of the microprocessor 90, for status purposes. When in the idle loops, i.e. when the microprocessor is waiting until the carrier data in is a zero (carrier on) or the microprocessor is waiting until the data is a "1", i.e. the rising edge of the second start bit "1", a twelve minute timer is kept as well as a "timer enable/disable" flag. If the timer is enabled, and it expires, the "B" bit is set to "0" and the status flag, which reflects the state of the "B" bit is changed. If the timer is enabled, offset values may be used to update it after a message is received, a function performed, or a false start bit is received. In the COPS 402 or 420 microprocessors, the internal timer may be used in many places, as shown in the listing in Appendix A.

Figure 17A:
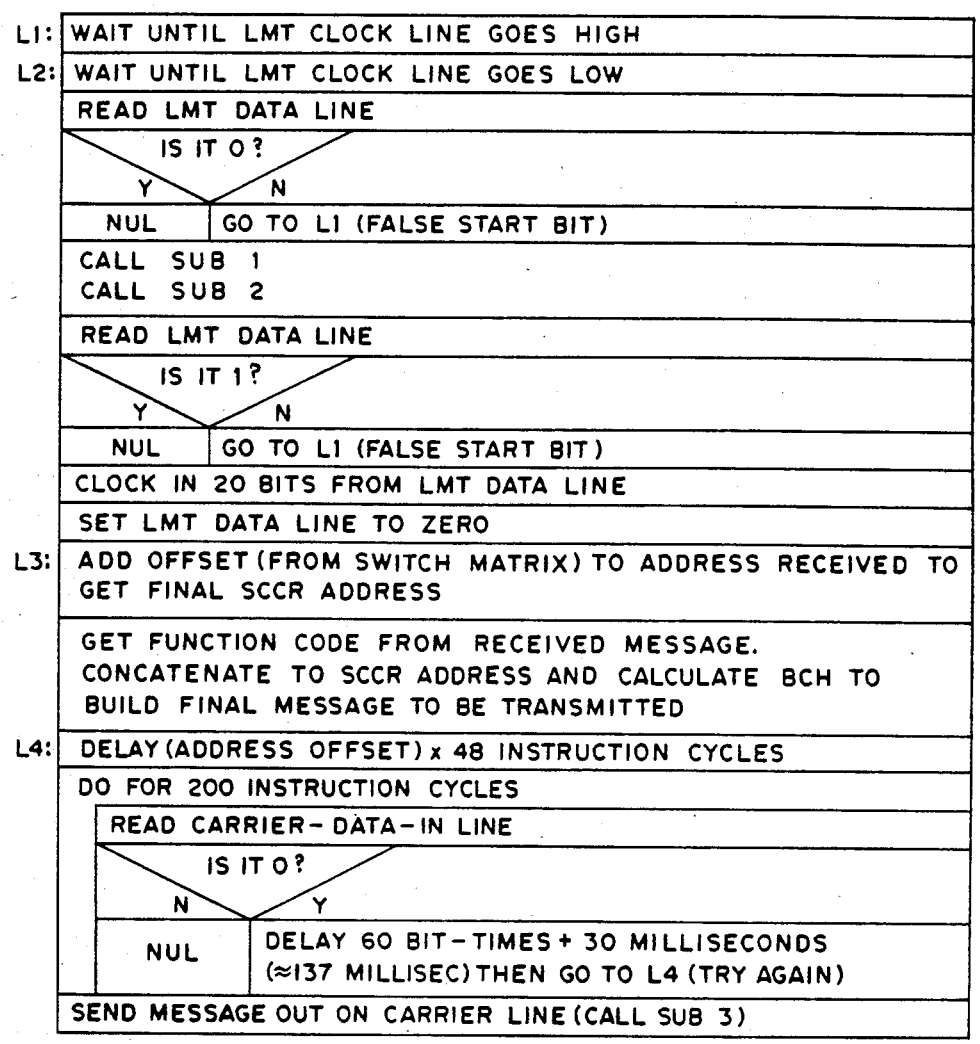
FIGS. 17a and 17b are a logic flow diagram showing the operation of the controller of FIG. 2 in a central load controller (CLC) or master mode.
Figure 17B:
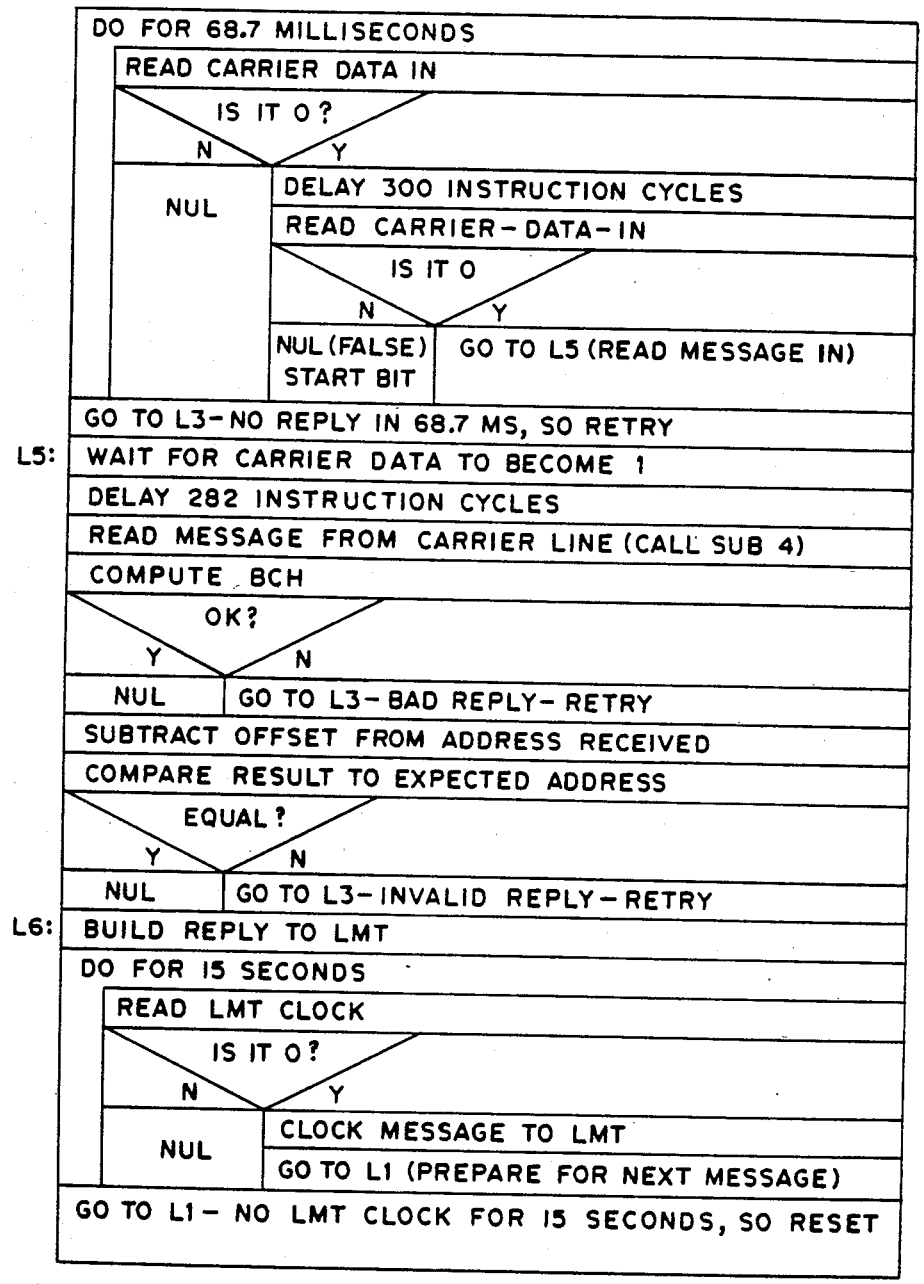

In FIGS. 17a and 17b the logic flow of the microprocessor 90 when operating in the master or CLC mode is shown. With regard to the subroutine no. 1 (sub 1) which is referred to in line 6 of the flow diagram of FIG. 17a, this subroutine requires that the microprocessor wait for the LMT clock line 48 to go from low to high and then delays 2 milliseconds to be sure that it is really high. If the clockline has not gone high after 1 second, an error has occurred and the software waits for the clock line to go high and then restarts to step No. 1. With regard to subroutine No. 2 (sub 2), which is also referred to on line 6 of FIG. 17a, in this subroutine the microprocessor 90 waits for the LMT clock line 48 to go from high to low, and then delays 2 milliseconds to be sure that it is really low. If the clock line has not gone low after one second, an error has occurred and this subroutine restarts to step No. 1 of FIG. 17a.

The subroutines 1 and 2 are used whenever reading from or writing to the LMT 26 over the bidirectional serial data line 44. During all loops and delays the LMT clock is watched. If it goes low before the point labelled L6 in FIG. 17b, an error message is immediately sent to the LMT in which the most significant bit F7 of the status code shown in FIG. 5 is set to 1 and the software resets to the L1 step shown in FIG. 17a.

With regard to line 3 of the L5 portion of the logic flow shown in FIG. 17b, it is pointed out that subroutine no. 4 is entered at the step labelled "do 28 times" rather than at the beginning of this subroutine because the initial steps of subroutine No. 4 are shown in the main flow diagram at the top of FIG. 17b.

Obviously, many modifications and variations of the present invention are possible in light of the above teachings. Thus it is to be understood that, within the scope of the appended claims, the invention may be practiced otherwise than as specifically described hereinabove.

APPENDIX A

Listing For uProc. 90 (COPS 402-Cross Assembler)

RAM LOCATIONS

| 3 | 003F | STATE | = | 3,15 |
|---|------|-------|---|------|
| 4 | 003E | BFLG  | = | 3,14 |
| 5 | 003D | FLAGS | = | 3,13 |
| 6 | 003C | TEMP  | = | 3,12 |
| 7 | 0036 | IDMS  | = | 3,6  |
| 8 | 0035 | IDMID | = | 3,5  |
| 9 | 0034 | IDLS  | = | 3,4  |

| | | | | | |
|---|---|---|---|---|---|
| 10 | 0031 | BCH | = | 3,1 | |
| 11 | 0030 | BCHLSB | = | 3,0 | |
| 12 | 0026 | CDAT | = | 2,6 | |
| 13 | 0023 | CFM | = | 2,3 | |
| 14 | 0022 | CFL | = | 2,2 | |
| 15 | 0020 | CDATL | = | 2,0 | |
| 16 | 0016 | LMDAT | = | 1,6 | |
| 17 | 0012 | LMDATL | = | 1,2 | |
| 18 | 0004 | T12MS | = | 0,4 | |
| 19 | 0000 | T12LS | = | 0,0 | |
| | | | | | COMMENTS |
| 20 | 0000 | PAGE | 0 | | |
| 21 | 000 00 | CLRA | | | ;POWER UP SEQUENCE |
| 22 | 001 51 | AISC | 1 | | ;SET BIT FOR L 4) |
| 23 | 002 3355 | OGI | 5 | | ;CLEAR G PORTS |
| 24 | 004 3360 | LEI | 0 | | ;DISABLE L PORTS |
| 25 | 006 333C | CAMQ | | | ;SET Q LATCHES TO 0 |
| 26 | 008 3F | LBI | 3,0 | | ;ZERO OUT RAM |
| 27 | PU1: | | | | |
| 28 | 009 00 | CLRA | | | |
| 29 | 00A 04 | XIS | | | |
| 30 | 00B C9 | JP | PU1 | | |
| 31 | 00C 12 | XABR | | | |
| 32 | 00D 5F | AISC | 15 | | ;REG 0 CLEARED? |
| 33 | 00E D1 | JP | PU2 | | ;YES,LEAVE LOOP |
| 34 | 00F 12 | XABR | | | ;NO,BR-1 TO BR |
| 35 | 010 C9 | JP | PU1 | | |
| 36 | PU2: | | | | |
| 37 | 011 3381 | LBI | 0,1 | | |

| | | | | | |
|---|---|---|---|---|---|
| 38 | 013 | 333E | OBD | | ;ENABLE D(0) |
| 39 | 015 | 332E | INL | | |
| 40 | 017 | 23B6 | XAD | IDMS | ;READ&STORE MS ADDR BITS |
| 41 | 019 | 3382 | LBI | 0,2 | |
| 42 | 01B | 333E | OBD | | ;ENABLE D(1) |
| 43 | 01D | 332E | INL | | |
| 44 | 01F | 23B5 | XAD | IDMID | ;READ&STORE MID ADDR BITS |
| 45 | 021 | 3384 | LBI | 0,4 | |
| 46 | 023 | 333E | PBD | | ;ENABLE D(2) |
| 47 | 025 | 332E | INL | | |
| 48 | 027 | 23B4 | XAD | IDLS | ;READ&STORE LS ADDR BITS |
| 49 | 029 | 32 | RC | | |
| 50 | 02A | 00 | CLRA | | |
| 51 | 02B | 50 | CAB | | ;TURN OFF SWITCHES |
| 52 | 02C | 333E | OBD | | |
| 53 | 02E | 3364 | LEI | 4 | ;ENABLE Q LATCHES |
| 54 | 030 | 3D | LBI | BFLG | |
| 55 | 031 | 71 | STII | 1 | ;BFLG:=1 (BRKR CLOSED) |
| 56 | 032 | 4F | XAS | | ;CLOCK IN MODE SWITCH |
| 57 | 033 | 4F | XAS | | ;MOVE TO AC |
| 58 | 034 | 5F | AISC | 15 | ;ZERO? |
| 59 | 035 | 6240 | JMP | CLCMD | ;YES,ENTER CLC MODE |
| 60 | 037 | 6108 | JMP | SCCRMD | ;NO,ENTER SCCR MODE |
| 61 | | | FORM | | |
| 62 | | TWTIM: | | | ;UPDATE 12 MIN CNTR |
| 63 | 039 | 41 | | SKT | ;TIMER OVERFLOW? |
| 64 | 03A | 48 | RET | | ;NO,DO NOTHING |
| 65 | 03B | 0F | LBI | T12LS | ;YES,DEC CNTR BY 1 |

```
66 03C 32              RC
67              TW1:
68 03D 00              CLRA
69 03E 40              COMP
70 03F 30              ASC
71 040 44              NOP
72 041 04              XIS
73 042 4E              CBA
74 043 5B              AISC    11          ;DONE ALL 5 DIGITS?
75 044 603D            JMP     TW1         ;NO
76 046 3384            LBI     T12MS       ;YES
77 048 13              SKMBZ   3           ;CNTR  0?
78 049 CB              JP      TW2         ;YES
79 04A 48              RET                 ;NO,RETURN
80              TW2:
81 04B 3C              LBI     FLAGS
82 04C 01              SKMBZ   0           ;TIMER ENABLED?
83 04D D5              JP      TW4         ;YES
84              TW3:                       ;REINIT CNTR
85 04E 0F              LBI     T12LS
86 04F 7C              STII    12          :TO 157,324 (2668C HEX)
87 050 78              STII    8
88 051 76              STII    6
89 052 76              STII    6
90 053 72              STII    2
91 054 48              RET
92              TW4:
93 055 3D              LBI     BFLG
94 056 71              STII    1           ;BFLG:=1
```

```
95  057  3355       OGI    5          ;CLOSE SOLENOID
96  059  CE         JP     TW3
97         CHKBCH:                    ;VERIFY THE BCH OF A RECEIVED
98                                    ;MESSAGE IN CDAT.ON RETURN,CARRY=0
99                                    ;MEANS BCH IS OK
100 05A  3F         LBI    BCHLSB
101 05B  71         STII   1          ;INIT BCH VALUE TO
102 05C  72         STII   2          ;21 HEX,THE VALUE
103 05D  33A6       LBI    CDAT       ;AFTER THE START BITS
104 05F  4E         CBA               ;ARE PROCESSED
105 060  23BC       XAD    TEMP       ;SAVE DIGIT ADDR IN
                                      TEMP
106        CHK1:
107 062  05         LD                ;GET A DIGIT FROM MSG
108 063  23BF       XAD    STATE      ;STORE IN STATE
109 065  85         JSRP   CALBCH     ;PROCESS 4 BITS
110 066  85         JSRP   CALBCH
111 067  85         JSRP   CALBCH
112 068  85         JSRP   CALBCH
113 069  3B         LBI    TEMP
114 06A  05         LD
115 06B  5F         AISC   15
116 06C  44         NOP
117 06D  06         X                 ;DEC DIGIT ADDR BY 1
118 06E  5E         AISC   14         ;WAS IT 1?
119 06F  F5         JP     CHK2       ;YES
120 070  05         LD                ;GET NEW DIGIT ADDR
121 071  33A6       LBI    CDAT       ;LOD BR
122 073  50         CAB               ;MOVE ADDR TO BD
123 074  E2         JP     CHK1       ;DO NEXT DIGIT
```

```
124            CHK2:
125 075 2320    LDD    CDATL      ;GET FINAL DIGIT
126 077 23BF    XAD    STATE      ;SAVE IN SATE
127 079 85      JSRP   CALBCH     ;PROCESS 2 BITS
128 07A 85      JSRP   CALBCH
129 07B 32      RC                ;RESET CARRY BIT
130 07C 3F      LBI    BCHLSB
131 07D 00      CLRA
132 07E 21      SKE               ;LS HALF=0?
133 07F 22      SC                ;NO,SET CARRY
134 080 33B1    LBI    BCH
135 082 21      SKE               ;MS HALF=0?
136 083 22      SC                ;NO,SET CARRY
137 084 48      RET
138            CALBCH:   ;ADD 1 BIT TO A BCH SERIES BASED
139                      ;ON X**6+X**5+1
140 085 3F      LBI    BCHLSB     ;POINT TO BCH LS 4 BITS
141 086 32      RC
142 087 05      LD                ;SHIFT LEFT
143 088 30      ASC
144 089 44      NOP
145 08A 04      XIS
146 08B 05      LD                ;DO MS 4 BITS
147 08C 30      ASC
148 08D 44      NOP
149 08E 06      X
150 08F 3E      LBI    STATE      ;POIN TO BIT VALUE
151 090 00      CLRA
152 091 13      SKMBZ  3          ;BIT=0?
```

| | | | | | |
|---|---|---|---|---|---|
|153|092|54|AISC|4|;NO,SET BIT IN AC|
|154|093|33B1|LBI|BCH| |
|155|095|02|XOR| |;LOOK AT MS BIT|
|156|096|5C|AISC|12|;ARE THEY UNEQUAL?|
|157|097|A0|JP|NMASK|;NO,DO NO MORE|
|158|098|3F|LBI|BCHLSB| |
|159|099|4D|SMB|0|;XOR IN ROOT POLY|
|160|09A|33B1|LBI|BCH| |
|161|09C|00|CLRA| | |
|162|09D|52|AISC|2| |
|163|09E|02|XOR| | |
|164|09F|06|X| | |
|165| | |NMASK:| | |
|166|0A0|42|RMB|2|;CLEAR MS 2 BITS|
|167|0A1|43|RMB|3| |
|168|0A2|3E|LBI|STATE|;SHIFT STATE LEFT 1|
|169|0A3|05|LD| | |
|170|0A4|31|ADD| | |
|171|0A5|06|X| | |
|172|0A6|48|RET| | |
|173| | |D197:| |;DELAY 197 INST CYCLES,INCL THE JSR|
|174|0A7|44|NOP| | |
|175|0A8|44|NOP| | |
|176|0A9|44|NOP| | |
|177| | |D194:| |;DELAY 1974 INST CYCLES,INCL THE JSR|
|178|0AA|44|NOP| | |
|179|0AB|44|NOP| | |
|180|0AC|44|NOP| | |

| | | | | |
|---|---|---|---|---|
| 181 | 0AD 60D1 | JMP | D188 | |
| 182 | | SUB1: | | ;ENTRY POINT FOR SUB1 |
| 183 | 0AF 63B7 | JMP | SUB1A | ;JUMP TO SUBR BODY |
| 184 | | SUB2: | | ;ENTRY POINT FOR SUB2 |
| 185 | 0B1 6393 | JMP | SUB2A | ;JUMP TO SUBR BODY |
| 186 | | SNDLMT: | | ;ENTRY POINT FOR SNDLMT |
| 187 | 0B3 6373 | JMP | SNDLMA | ;JUMP TO SUBR BODY |
| 188 | | RDMLMT: | | ;ENTRY POINT FOR RDLMT |
| 189 | 0B5 6385 | JMP | RDLMTA | ;JUMP TO SUBR BODY |
| 190 | 0B7 44 | NOP | | |
| 191 | 0B8 44 | NOP | | |
| 192 | | SNDLMT: | | ;SEND 1 BIT OUT ON CARRIER LINE |
| 193 | 0B9 233F | LDD | BFLG | ;GET BREAKER STATE |
| 194 | 0BB 52 | AISC | 2 | ;CARRIER ON |
| 195 | 0BC 06 | X | | |
| 196 | 0BD 333A | OMG | | ;OUTPUT THE 0 SYNC BIT |
| 197 | 0BF 06 | X | | ;RESTORE MEMORY |
| 198 | 0C0 68D1 | JSR | D188 | ;DELAY 193 CYCLES |
| 199 | 0C2 44 | NOP | | |
| 200 | 0C3 44 | NOP | | |
| 201 | 0C4 44 | NOP | | |
| 202 | 0C5 233E | LDD | BFLG | ;GET BREAKER STATE |
| 203 | 0C7 52 | AISC | 2 | ;CARRIER ON |
| 204 | 0C8 13 | SKMBZ | 3 | ;DATA=0? |
| 205 | 0C9 54 | AISC | 4 | ;NO,SET BIT IN AC |
| 206 | 0CA 06 | X | | |
| 207 | 0CB 333A | OMG | | ;OUTPUT THE DATA BIT |
| 208 | 0CD 06 | X | | |
| 209 | 0CE 05 | LD | | ;SHIFT DATA LEFT |

```
210 0CF 31        ADD
211 0D0 06        X
212      D188:              ;DELAY 188 CYCLES
213 0D1 22        SC         ;(INCL THE RET)
214 0D2 00        CLRA
215 0D3 5C        AISC  12   ;LOOP 4 TIMER
216      D1881:
217 0D4 23BC      XAD   TEMP
218 0D6 3328      ININ        ;READ IN PORTS
219 0D8 06        X
220 0D9 01        SKMBZ 0     ;LMT CLK LOW?
221 0DA 20        SKC         ;NO,SKIP 2 BYTES
222 0DB 635D      JMP   ERROR ;YES,SEND ERROR RESPONSE
223 0DD 06        X
224 0DE 00        CLRAA
225 0DF 51        AISC  1     ;LOOP 15 TIMES
226 0E0 51        AISC  1
227 0E1 E0        JP    -1
228 0E2 233C      LDD   TEMP
229 0E4 51        AISC  1     ;DONE?
230 0E5 D4        JP    D1881 ;NO
231 0E6 48        RET
232      DELAY:              ;WAIT FOR CARRIER TO RISE
233 0E7 00        CLRA
234 0E8 5D        AISC  13    ;3 SKT'S
235      DLY:
236 0E9 06        X
237 0EA 3328      ININ        ;READ PORTS
238 0EC 06        X
```

```
239 0ED 01        SKMBZ   0           ;LMT CALLING?
240 0EE F1        JP      +3          ;NO
241 0EF 635D      JMP     ERROR       ;YES,SEND ERR MSG
242 0F1 41        SKT
243 0F2 E9        JP      DLY         ;WAIT
244 0F3 51        AISC    1           ;INC CNT
245 0F4 E9        JP      DLY         ;NOT DONE
246 0F5 48        RET                 ;DONE
247               FORM
248     0100      PAGE 4
249               ;JUMP TABLE FOR SCCR FUNCTIONS
250 100 8A        ADDR    FC7         ;0
251 101 8A        ADDR    FC7         ;1
252 102 8A        ADDR    FC7         ;2
253 103 8A        ADDR    FC7         ;3
254 104 59        ADDR    FC4         ;4
255 105 60        ADDR    FC5         ;5
256 106 6A        ADDR    FC6         ;6
257 107 8A        ADDR    FC7         ;7
258       SCRRMD;                     ;SCCR MODE
259 108 3C        LBI     FLAGS
260 109 4D        SMB     0           ;ENABLE 12 MIN CNTR
261 10A 684E      JSR     TW3         ;INIT THE CNTR
262       SC1:
263 10C 3328      ININ                ;READ PORTS
264 10E 58        AISC    8           ;DATA BIT LOW?
265 10F D3        JP      SC3         ;YES
266       SC2:
267 110 6839      JSR     TWTIM       ;NO,UPDATE 12 MIN CNTR
```

| | | | | | |
|---|---|---|---|---|---|
| 268 | 112 | CC | JP | SC1 | ;LOOP BACK |
| 269 | | SC3: | | | |
| 270 | 113 | 68D1 | JSR | D188 | ;DELAY 300 CYCLES |
| 271 | 115 | 22 | SC | | |
| 272 | 116 | 00 | CLRA | | |
| 273 | 117 | 5E | AISC | 14 | |
| 274 | 118 | 68D4 | JSR | D1881 | |
| 275 | 11A | 00 | CLRA | | |
| 276 | 11B | 5A | AISC | 10 | |
| 277 | 11C | 51 | AISC | 1 | |
| 278 | 11D | DC | JP | -1 | |
| 279 | 11E | 3328 | ININ | | ;READ AGAIN |
| 280 | 120 | 58 | AISC | 8 | ;STILL 0? |
| 281 | 121 | E3 | JP | SC4 | ;YES |
| 282 | 122 | D0 | JP | SC2 | ;NO,FALSE START BIT |
| 283 | | SC4: | | | |
| 284 | 123 | 3328 | ININ | | ;WAIT FOR RISING EDGE |
| 285 | 125 | 58 | AISC | 8 | |
| 286 | 126 | E3 | JP | -3 | |
| 287 | 127 | 22 | SC | | ;DELAY 282 CYCLES |
| 288 | 128 | 00 | CLRA | | |
| 289 | 129 | 5A | AISC | 10 | |
| 290 | 12A | 68D4 | JSR | D1881 | |
| 291 | 12C | 69B7 | JSR | RDCAR | ;READ&STORE MESSAGE |
| 292 | 12E | 685A | JSR | CHKBCH | ;CALC BCH |
| 293 | 130 | 20 | SKC | | ;GOOD? |
| 294 | 131 | 613F | JMP | SC7 | ;YES |
| 295 | | SC61: | | | ;NO |
| 296 | 133 | 6A26 | JSR | DEC13 | ;SUB. OFFSET FROM CNTR |

```
297 135 3328         ININ                 ;WAIT FOR DATA TO BE 1
298 137 58           AISC    8
299 138 FB           JP      +3           ;STILL 0
300 139 610C         JMP     SC1          ;IS 1,LOOP BACK
301 13B 6839         JSR     TWTIM        ;UPDATE TIMER
302 13D 6135         JMP     SC61+2       ;LOOK AGAIN
303         SC7:
304 13F 33B4         LBI     IDLS         ;CHECK ADDR IN MESSAGE
305         SC71:
306 141 15           LD      1
307 142 21           SKE                  ;THIS DIGIT SAME AS MINE?
308 143 6133         JMP     SC61         ;NO,MSG IS NOT FOR ME
309 145 14           XIS     1            ;YES, INC BD
310 146 4E           CBA
311 147 59           AISC    9            ;DONE LAST DIGIT?
312 148 C1           JP      SC71         ;NO
313 149 33A3         LBI     CFM          ;YES, ALL EQUAL
314 14B 00           CLRA
315 14C 21           SKE                  ;FUNC CODE MS=0?
316 14D D2           JP      SC72         ;NO
317 14E 07           XDS                  ;YES,LOOK AT LS
318 14F 13           SKMBZ   3            ;LS  7?
319 150 77           STII    7            ;YES,SET IT TO 7
320 151 D5           JP      SC8          ;PROCESS COMMAND
321         SC72:
322 152 33A2         LBI     CFL          ;SET LS CODE TO 7
323 154 77           STII    7
324         SC8:
325 155 33A2         LBI     CFL          ;POINT TO LS OF CODE
```

| | | | | |
|---|---|---|---|---|
| 326 | 157 | 00 | CLRA | | ;SET UP JUMP ADDR |
| 327 | 158 | FF | JID | | ;EXECUTE INSTRUCTION |
| 328 | | FC4: | | | ;FUNCTION 4 |
| 329 | 159 | 3355 | OGI | 5 | ;CLOSE BREAKER |
| 330 | 15B | 3C | LBI | FLAGS | |
| 331 | 15C | 4D | SMB | 0 | ;ENABLE 12 MIN CNTR |
| 332 | 15D | 3D | LBI | BFLG | |
| 333 | 15E | 71 | STII | 1 | ;BFLG:=1 |
| 334 | 15F | F5 | JP | FC62 | |
| 335 | | FC5: | | | ;FUNCTION 5 |
| 336 | 160 | 3354 | OGI | | ;OPEN BREAKER |
| 337 | 162 | 3C | LBI | FLAGS | |
| 338 | 163 | 4C | RMB | 0 | ;DISABLE 12 MN CNTR |
| 339 | 164 | 3B | LBI | TEMP | |
| 340 | 165 | 00 | CLRA | | |
| 341 | 166 | 06 | X | | ;SET RAM DIGIT TO 0 |
| 342 | 167 | 00 | CLRA | | |
| 343 | 168 | 52 | AISC | 2 | ;SET BIT FOR "S" LED |
| 344 | 169 | F3 | JP | FC61 | ;LATCH DATA & CONTINUE |
| 345 | | FC6: | | | ;FUNCTION 6 |
| 346 | 16A | 3354 | OGI | 4 | ;OPEN BREAKER |
| 347 | 16C | 3C | LBI | FLAGS | |
| 348 | 16D | 4D | SMB | 0 | ;ENABLE 12 MIN CNTR |
| 349 | 16E | 3B | LBI | TEMP | |
| 350 | 16F | 00 | CLRA | | |
| 351 | 170 | 06 | X | | ;SET RAM DIGIT TO 0 |
| 352 | 171 | 00 | CLRA | | |
| 353 | 172 | 54 | AISC | 4 | ;SET BIT FOR "P" LED |
| 354 | | FC61: | | | |

```
355 173 3D        LBI   BFLG
356 174 70        STII  0          ;BFLG:=0
357        FC62:
358 175 3360      LEI   0          ;DISABLE L LINES
359 177 333C      CAMQ             ;LOAD Q LATCHES
360 179 3364      LEI   4          ;LATCH TO L LINES
361 17B 684E      JSR   TW3        ;INIT 12 MIN CNTR
362 17D 3E        LBI   STATE      ;DELAY 29 7 MILLISEC
363 17E 00        CLRA             ;(6646 CYCLES)
364 17F 55        AISC  5
365        SC9:
366 180 06        X
367 181 AA        JSRP  D194
368 182 AA        JSRP  D194
369 183 AA        JSRP  D194
370 184 06        X
371 185 51        AISC  1          ;INC CTR
372 186 6180      JMP   SC9        ;NOT DONE
373 188 A7        JSRP  D197
374 189 CC        JP    SCA        ;DONE
375        FC7:                    ;FUNCTION 7 (NOP)
376 18A 6A26      JSR   DEC13      ;SUBTRACT OFFSET FROM CNTR
377        SCA:
378 18C 3388      LBI   0,8
379 18E 3360      LEI   0          ;DISABLE Q LATCH
380 190 333E      OBD              ;ENABLE TOGGLE SWITCHES
381 192 33A3      LBI   OFM
382 194 332E      INL              ;READ
383 196 06        X                ;STORE D&C IN MS DIGIT
```

| | | | | | |
|---|---|---|---|---|---|
|384|197|43|rmb|3|;CLEAR MS 2 BITS|
|385|198|42|RMB|2| |
|386|199|33A2|LBI|CFL| |
|387|19B|332E|INL| | |
|388|19D|3364|LEI|4|;REENABLE Q LATCH|
|389|19F|06|X| |;STORE B&A IN LS DIGIT|
|390|1A0|45|RMB|1|;CLEAR F1 BIT|
|391|1A1|4C|RMB|0|;CLEAR B BIT|
|392|1A2|0F|LBI|0,0| |
|393|1A3|333E|OBD| |;TURN OFF SWITCHES|
|394|1A5|33A2|LBI|CFL| |
|395|1A7|3328|ININ| |;READ IN PORTS|
|396|1A9|06|X| |;DATA TO RAM & RAM TO AC|
|397|1AA|11|SKMBZ|1|;F1=0?|
|398|1AB|52|AISC|2|;NO,SET BIT IN AC|
|399|1AC|06|X| |;STORE|
|400|1AD|233E|LDD|BFLG| |
|401|1AF|5F|AISC|15|;BFLG=0?|
|402|1B0|4D|SMB|0|;YES,SET BIT IN RAM|
|403|1B1|69D2|JSR|BLDBCH|;CALC BCH & ADD TO MSG|
|404|1B3|6A07|JSR|SEND|;SEND MESSAGE|
|405|1B5|6133|JMP|SC61|;LOOP BACK|
|406| | |RDCAR:| |;SUBR TO READ A SERIAL MESSAGE FROM|
|407| | | | |;THE CARRIER-DATA-IN LINE (1N(3))|
|408| | | | |;AND STORE IN CDAT (28 BITS READ, LAST 2|
|409| | | | |;ARE IGNORED)|
|410|1B7|33A6|LBI|CDAT| |
|411| | |RDC1:| | |
|412|1B9|6BE1|JSR|RDBIT|;READ & SET A BIT|

| | | | | | |
|---|---|---|---|---|---|
|413|1BB|05| |LD| |
|414|1BC|31| |ADD|;SHIFT DATA LEFT|
|415|1BD|06| |X| |
|416|1BE|6BE1| |JSR RDBIT|;READ|
|417|1C0|05| |LD|;SHIFT|
|418|1C1|31| |ADD| |
|419|1C2|06| |X| |
|420|1C3|6BE1| |JSR RDBIT|;READ|
|421|1C5|05| |LD|;SHIFT|
|422|1C6|31| |ADD| |
|423|1C7|06| |X| |
|424|1C8|6BE1| |JSR RDBIT|;READ|
|425|1CA|05| |LD| |
|426|1CB|07| |XDS|;DONE?|
|427|1CC|61B9| |JMP RDC1|;NO|
|428|1CF|2F| |LBI CDATL|;YES|
|429|1CF|4C| |RMB 0|;CLEAR LAST 2 BITS|
|430|1D0|45| |RMB 1| |
|431|1D1|48| |RET| |
|432| | |BLDBCH:|;CALC BCH FOR A MESSAGE & APPEND| |
|433| | | |;TO THE MESSAGE,LEFT JUSTIFIED| |
|434|1D2|3F| |LBI BCHLSB|;INIT BCH TO 21 HEX TO|
|435|1D3|71| |STII 1|;ACCOUNT FOR THE START|
|436|1D4|72| |STII 2|;BITS|
|437|1D5|33A6| |LBI CDAT| |
|438|1D7|4E| |CBA| |
|439|1D8|23BC| |XAD TEMP|;SAVE DIGIT ADDR IN TEMP|
|440| | |BLD1:| | |
|441|1DA|05| |LD| |

| | | | | | |
|---|---|---|---|---|---|
| 442 | 1DB | 23BF | XAD | STATE | ;MOVE DIGIT TO STATE |
| 443 | 1DD | 85 | JSRP | CALBCH | ;PROCESS 4 BITS |
| 444 | 1DE | 85 | JSRP | CALBCH | |
| 445 | 1DF | 85 | JSRP | CALBCH | |
| 446 | 1E0 | 85 | JSRP | CALBCH | |
| 447 | 1E1 | 3B | LBI | TEMP | |
| 448 | 1E2 | 05 | LD | | |
| 449 | 1E3 | 5F | AISC | 15 | |
| 450 | 1E4 | 44 | NOP | | |
| 451 | 1E5 | 06 | X | | ;DEC DIGIT ADDR |
| 452 | 1E6 | 5D | AISC | 13 | ;WAS IT 2? |
| 453 | 1E7 | 61EF | JMP | BLD2 | ;YES,LEAVE LOOP |
| 454 | 1E9 | 05 | LD | | ;NO,GET NEW ADDR |
| 455 | 1EA | 33A6 | LBI | CDAT | ;LOAD BR |
| 456 | 1EC | 50 | CAB | | ;LOAD BD |
| 457 | 1ED | 61DA | JMP | BLD1 | |
| 458 | | BLD2: | | | |
| 459 | 1EF | 00 | CLRA | | |
| 460 | 1F0 | 5E | AISC | 14 | ;LOOP 2 TIMES |
| 461 | | BLD3: | | | |
| 462 | 1F1 | 23BC | XAD | TEMP | |
| 463 | 1F3 | 3F | LBI | BCHLSB | ;SHIFT LEFT |
| 464 | 1F4 | 32 | RC | | |
| 465 | 1F5 | 05 | LD | | |
| 466 | 1F6 | 30 | ASC | | |
| 467 | 1F7 | 44 | NOP | | |
| 468 | 1F8 | 04 | XIS | | |
| 469 | 1F9 | 05 | LD | | |
| 470 | 1FA | 30 | ASC | | |

```
471  1FB  44            NOP
472  1FC  07            XDS
473  1FD  23BC          XAD    TEMP
474  1FF  51            AISC   1        ;INC LOOP CNT
475  200  61F1          JMP    BLD3     ;SHIFT AGAIN
476  202  15            LD     1        ;GET LS & BR:=2
477  203  14            XIS    1        ;STORE IN MSG.BR:=3
478  204  15            LD     1        ;GET MS & BR:=2
479  205  06            X               ;STORE IN MSG
480  206  48            RET
481            SEND:             ;SEND THE MESSAGE IN CDAT OUT THE
482                               ;CARRIER LINE SEND 2 START BITS
483                               ;AND 28 DATA BITS
484                               ;DESTROYS MESSAGE IN CDAT
485  207  233E          LDD    BFLG     ;GET STATE OF B
486  209  56            AISC   6        ;SET BIT 2 & 3
487  20A  3E            LBI    STATE
488  20B  06            X               ;CARRIER DATA TO 1
489  20C  333A          OMG             ;AND TURN CARRIER ON
490  20E  68E7          JSR    DELAY    ;DELAY
491  210  43            RMB    3
492  211  B9            JSRP   SNDBIT   ;SEND FIRST START BIT
493  212  4B            SMB    3
494  213  B8            JSRP   SNDBIT-1 ;SEND SECOND START BIT
495  214  33A6          LBI    CDAT
496  216  44            NOP
497           SND1:
498  217  B9            JSRP   SNDBIT   ;WRITE 4 BITS
499  218  B7            JSRP   SNDBIT-2
```

```
500  219  B7        JSRP    SNDBIT-2
501  21A  B7        JSRP    SNDBIT-2
502  21B  07        XDS             ;DEC DIGIT ADDR
503  21C  D7        JP      SND1    ;SEND NEXT DIGIT
504  21D  233E      LDD     BFLG    ;DONI,GET STATE OF B
505  21F  3B        LBI     TEMP
506  220  54        AISC    4       ;DATA-OUT TO 1 AND
507  221  06        X               ;TURN OFF CARRIER
508  222  333A      OMG
509  224  60E7      JMP     DELAY   ;WAIT, THEN RET
510            DEC13:          ;SUBR TO SUBTRACT 13 FROM 12
                                    MIN CNTR
511  226  32        RC              ;CLEAR CARRY
512  227  0F        LBI     T12LS
513  228  00        CLRA
514  229  53        AISC    3
515  22A  30        ASC
516  22B  44        NOP
517  22C  04        XIS
518            DEC131:
519  22D  00        CLRA
520  22E  40        COMP
521  22F  30        ASC
522  230  44        NOP
523  231  04        XIS
524  232  4E        CBA
525  233  5B        AISC    11      ;DONE?
526  234  ED        JP      DEC131  ;NO
527  235  48        RET
```

| | | | | |
|---|---|---|---|---|
| 528 | | FORM | | |
| 529 | 0240 | PAGE 9 | | |
| 530 | | CLCMD: | | ;CLC MODE |
| 531 | 240 00 | CLRA | | ;SET L(4) TO L |
| 532 | 241 51 | AISC | 1 | |
| 533 | 242 3360 | LEI | 0 | |
| 534 | 244 333C | CAMQ | | |
| 535 | 246 3364 | LEI | 4 | ;ADDED BY PS |
| 536 | 248 3B | LBI | TEMP | |
| 537 | 249 3328 | ININ | | ;READ IN PORTS |
| 538 | 24B 06 | X | | |
| 539 | 24C 01 | SKMBZ | 0 | ;LMT CLK HIGH? |
| 540 | 24D CF | JP | CLC1 | ;YES |
| 541 | 24E C0 | JP | CLCMD | ;NO,WAIT |
| 542 | | CLC1: | | |
| 543 | 24F 3B | LBI | TEMP | |
| 544 | 250 3328 | ININ | | :RAD PORTS |
| 545 | 252 06 | X | | |
| 546 | 253 01 | SKMBZ | 0 | ;LMT CLK LOW? |
| 547 | 254 CF | JP | CLC1 | ;NO,WAIT |
| 548 | 255 332E | INL | | ;YES,READ L LIES |
| 549 | 257 01 | SKMBZ | 0 | ;L(4)=0? (DATA LINE) |
| 550 | 258 C0 | JP | CLCMD | ;NO,BAD START BIT |
| 551 | 259 AF | JSRP | SUB1 | ;YES,WAIT FOR CLK TO CHANGE |
| 552 | 25A B1 | JSRP | SUB2 | ;WAIT FOR NEXT BIT |
| 553 | 25B 332E | INL | | ;READ DATA |
| 554 | 25D 01 | SKMBZ | 0 | ;IS IT 1? |
| 555 | 25F F0 | JP | +2 | ;YES |

| | | | | | |
|---|---|---|---|---|---|
| 556 | 25F | C0 | JP | CLCMD | ;NO,BAD START BITS |
| 557 | 260 | 3396 | LBI | LMDAT | |
| 558 | | CLC2: | | | ;CLOCK IN 20 BITS |
| 559 | 262 | 00 | CLRA | | |
| 560 | 263 | 06 | X | | |
| 561 | 264 | B5 | JSRP | RDLMT | ;READ 4 BITS |
| 562 | 265 | B5 | JSRP | RDLMT | |
| 563 | 266 | B5 | JSRP | RDLMT | |
| 564 | 267 | B5 | JSRP | RDLMT | |
| 565 | 268 | 05 | LD | | |
| 566 | 269 | 07 | XDS | | ;DEC BD REG. |
| 567 | 26A | 4E | CBA | | |
| 568 | 26B | 5E | AISC | 14 | ;BD=1? |
| 569 | 26C | EE | JP | +2 | ;YES,DONE |
| 570 | 26D | E2 | JP | CLC2 | ;NO |
| 571 | 26E | AF | JSRP | SUB1 | ;WAIT FOR END OF BIT |
| 572 | 26F | 00 | CLRA | | |
| 573 | 270 | 3360 | LEI | 0 | ;DISABLE L LINES |
| 574 | 272 | 333C | CAMQ | | ;PUT 0 ON DATA LINE |
| 575 | 274 | 3364 | LEI | 4 | ;LATCH TO L |
| 576 | | CLC3: | | | |
| 577 | 276 | 3396 | LBI | LMDAT | ;MOVE MSG TO CDAT |
| 578 | 278 | 35 | LD | 3 | |
| 579 | 279 | 37 | XDS | 3 | |
| 580 | 27A | F8 | JP | −2 | |
| 581 | 27B | 33B4 | LBI | IDLS | ;ADD OFFSET TO ADDR |
| 582 | 27D | 32 | RC | | ;AND STORE IN CDAT |
| 583 | | CLC31: | | | |

```
584 27E  15      LD     1         ;GET ID# DIGIT
585 27F  30      ASC              ;ADD MSG DIGIT
586 280  44      NOP
587 281  14      XIS    1         ;STORE IN MSG
588 282  4E      CBA
589 283  59      AISC   9         ;DONE?
590 284  627E    JP     CLC31     ;NO
591 286  3B      LBI    TEMP
592 287  3328    ININ
593 289  06      X
594 28A  01      SKMBZ  0         ;IS LMT CALLING?
595 28B  CE      JP     +3        ;NO
596 28C  635D    JMP    ERROR     ;YES
597 28E  69D2    JSR    BLDBCH    ;CALC BCH&ADD TO MSG
598          CLC4:
599 290  33B6    LBI    IDMS      ;MOVE ID # TO REG 0
600 292  35      LD     3
601 293  37      XDS    3
602 294  D2      JP     -2
603          CLC41:             ;COUNT DOWN ON ID#
604 295  3384    LBI    0,4
605 297  32      RC
606          CLC42:             ;DEC ID# BY 1
607 298  00      CLRA
608 299  40      COMP
609 29A  30      ASC
610 29B  44      NOP
611 29C  04      XIS
```

```
612  29D  4E      CBA
613  29E  59      AISC   9
614  29F  D8      JP     CLC42
615  2A0  20      SKC             ;ID#  0?
616  2A1  EA      JP     CLC5     ;YES
617  2A2  3B      LBI    TEMP     ;NO,CHECK LMT CLK
618  2A3  3328    ININ
619  2A5  06      X
620  2A6  01      SKMBZ  0        ;LOW?
621  2A7  D5      JP     CLC41    ;NO
622  2A8  635D    JMP    ERROR    ;YES
623          CLC5:
624  2AA  00      CLRA
625  2AB  23BC    XAD    TEMP     ;STORE CTR
626  2AD  3328    ININ            ;READ PORTS
627  2AF  06      X
628  2B0  01      SKMBZ  0        ;LMT CLK LOW?
629  2B1  F4      JP     +3       ;NO
630  2B2  635D    JMP    ERROR    ;YES,SEND ERR MSG
631  2B4  06      X
632  2B5  58      AISC   8        ;DATA=0?
633  2B6  FD      JP     CLC5C    ;YES,CARRIER IS THERE
634  2B7  233C    LDD    TEMP     ;NO,INC CTR
635  2B9  51      AISC   1
636  2BA  EB      JP     CLC5+1
637  2BB  62D9    JMP    CLC6     ;NO CARRIER DETECTED
638          CLC5C:
639                              ;DELAY 60 BIT-TIMES+ 30 MILLISEC
```

| | | | | | |
|---|---|---|---|---|---|
| 640 | | | | | ;(ABOUT). MONITER THE LMT CLK |
| 641 | | | | | ;DELAY IS ABOUT 30 SKTS |
| 642 | 2BD | 32 | | RC | |
| 643 | 2BE | 3C | | LB | FLAGS |
| 644 | 2BF | 00 | CLC51: | CLRA | |
| 645 | 2C0 | 51 | | AISC | 1 ;15 SKT LOOP |
| 646 | 2C1 | 23BC | CLC52: | XAD | TEMP |
| 647 | 2C3 | 3328 | | ININ | ;READ IN PORTS |
| 648 | 2C5 | 06 | | X | |
| 649 | 2C6 | 01 | | SKMBZ | 0 ;LMT CALLING? |
| 650 | 2C7 | CA | | JP | +3 ;NO |
| 651 | 2C8 | 635D | | JMP | ERROR ;YES |
| 652 | 2CA | 41 | | SKT | ;TIME UP? |
| 653 | 2CB | 62C3 | | JMP | CLC52+2 ;NO.WAIT |
| 654 | 2CD | 23BC | | XAD | TEMP ;YES,DEC CNT |
| 655 | 2CF | 51 | | AISC | 1 ;DONE? |
| 656 | 2D0 | 62C1 | | JMP | CLC52 ;NO |
| 657 | 2D2 | 20 | | SKC | ;YES,WAIT OVER? |
| 658 | 2D3 | D6 | | JP | +3 ;NO |
| 659 | 2D4 | 6290 | | JMP | CLC4 ;YES,CNT DOWN & RETRY |
| 660 | 2D6 | 22 | | SC | ;SET FLAG |
| 661 | 2D7 | 62BF | | JMP | CLC51 |
| 662 | | | CLC6: | | ;SEND MSG |
| 663 | 2D9 | 3D | | LB | BFLG |
| 664 | 2DA | 70 | | STII | 0 ;CLEAR BFLG |
| 665 | 2DB | 6A07 | | JSR | SEND |
| 666 | 2DD | 3B | | LBI | TEMP ;WAIT |
| 667 | 2DE | 00 | | CLRA | |

| | | | | | |
|---|---|---|---|---|---|
| 668 | 2DF | 51 | | AISC | 1 | ;UP TO 15 SKT'S |
| 669 | | | CLC61: | | |
| 670 | 2E0 | 06 | | X | |
| 671 | 2E1 | 3328 | | ININ | | ;READ PORST |
| 672 | 2E3 | 06 | | X | |
| 673 | 2E4 | 01 | | SKMBZ | 0 | ;LMT CLK LOW? |
| 674 | 2E5 | E8 | | JP | +3 | ;NO,CONTINUE |
| 675 | 2E6 | 635D | | JMP | ERROR | ;YES,SEND ERROR TO LMT |
| 676 | 2E8 | 13 | | SKMBZ | 3 | ;CARRIER DATA? |
| 677 | 2E9 | EB | | JP | CLC62 | ;NO |
| 678 | 2EA | F1 | | JP | CLC7 | ;YES |
| 679 | | | CLC62: | | |
| 680 | 2EB | 41 | | SKT | | ;TIMER OVF? |
| 681 | 2EC | E0 | | JP | CLC61 | ;NO |
| 682 | 2ED | 51 | | AISC | 1 | ;YES, INC CTR. DONE? |
| 683 | 2EE | E0 | | JP | CLC61 | ;NO |
| 684 | 2EF | 6276 | | JMP | CLC3 | ;NO REPLY IN 40 MS. RETRY |
| 685 | | | CLC7: | | |
| 686 | 2F1 | 06 | | X | | ;SAVE LOOP CTR |
| 687 | 2F2 | 68D1 | | JSR | D188 | ;DELAY 300 CYCLES |
| 688 | 2F4 | 22 | | SC | |
| 689 | 2F5 | 00 | | CLRA | |
| 690 | 2F6 | 5E | | AISC | 14 |
| 691 | 2F7 | 68D4 | | JSR | D1881 |
| 692 | 2F9 | 00 | | CLRA | |
| 693 | 2FA | 5A | | AISC | 10 |
| 694 | 2FB | 51 | | AISC | 1 |
| 695 | 2FC | FB | | JP | -1 |

| | | | | |
|---|---|---|---|---|
| 696 | 2FD 3328 | ININ | | ;READ AGAIN |
| 697 | 2FF 58 | AISC | 8 | ;STILL 0? |
| 698 | 300 C3 | JP | CLC71 | ;YES |
| 699 | 301 62E1 | JMP | CLC61+1 | ;NO,FALSE START BIT |
| 700 | | CLC71: | | |
| 701 | 303 3328 | ININ | | ;WAIT FOR RISING EDGE |
| 702 | 305 06 | X | | |
| 703 | 306 01 | SKMBZ | 0 | ;LMT CLK LOW? |
| 704 | 307 630B | JMP | +4 | ;NO |
| 705 | 309 635D | JMP | ERROR | ;YES,SEND ERR RESPONSE |
| 706 | 30B 06 | X | | |
| 707 | 30C 58 | AISC | 8 | ;CARRIER DATA=1? |
| 708 | 30D 6303 | JMP | CLC71 | ;NO,WAIT |
| 709 | 30F 22 | SC | | ;DELAY 282 CYCLES |
| 710 | 310 00 | CLRA | | |
| 711 | 311 5A | AISC | 10 | |
| 712 | 312 68D4 | JSR | D1881 | |
| 713 | 314 69B7 | JSR | RDCAR | ;READ & STORE MSG |
| 714 | 316 685A | JSR | CHKBCH | ;CHECK BCH |
| 715 | 318 20 | SKC | | ;GOOD? |
| 716 | 319 DC | JP | +3 | ;YES |
| 717 | 31A 6276 | JMP | CLC3 | ;NO,RESEND MSG |
| 718 | 31C 3328 | ININ | | |
| 719 | 31E 3B | LBI | TEMP | |
| 720 | 31F 06 | X | | |
| 721 | 320 01 | SKMBZ | 0 | ;LMT CALL ING? |
| 722 | 321 E4 | JP | +3 | ;NO,CONTINUE |
| 723 | 322 635D | JMP | ERROR | ;YES |

| | | | | | |
|---|---|---|---|---|---|
| 724 | 324 | 33B4 | LBI | IDLS | ;SUBTRACT OFFSET FROM ADDR |
| 725 | 326 | 22 | SC | | |
| 726 | | | CLC8: | | |
| 727 | 327 | 15 | LD | 1 | ;GET ADDR DIGIT |
| 728 | 328 | 10 | CASC | | |
| 729 | 329 | 44 | NOP | | |
| 730 | 32A | 14 | XIS | 1 | ;SAVE IN MSG |
| 731 | 32B | 4E | CBA | | |
| 732 | 32C | 59 | AISC | 9 | ;DONE? |
| 733 | 32D | E7 | JP | CLC8 | ;NO |
| 734 | 32E | 3396 | LBI | LMDAT | ;VERIFY ADDR |
| 735 | | | CLC81: | | |
| 736 | 330 | 35 | LD | 3 | |
| 737 | 331 | 21 | SKE | | ;THIS DIGIT OK? |
| 738 | 332 | 6276 | JMP | CLC3 | :NO,RESEND MSG |
| 739 | 334 | 34 | XIS | 3 | ;YES |
| 740 | 335 | 4E | CBA | | |
| 741 | 336 | 59 | AISC | 9 | ;DONE ALL DIGITS? |
| 742 | 337 | F0 | JP | CLC81 | ;NO |
| 743 | 338 | 33A2 | LBI | CFL | ;YES,ADDR IS OK |
| 744 | 33A | 35 | LD | 3 | ;MOVE STATUS BITS |
| 745 | 33B | 34 | XIS | 3 | ;TO LMT MSG BUFFER |
| 746 | 33C | 35 | LD | 3 | |
| 747 | 33D | 34 | XIS | 3 | |
| 748 | 33E | 0F | LBI | 0,0 | |
| 749 | 33F | 7D | STII | 13 | ;INIT 15 SEC TIMER |
| 750 | 340 | 7C | STII | 12 | ;3277 SKT"s |
| 751 | 341 | 7C | STII | 12 | |

```
752          CLC9:
753 342 3B      LBI     TEMP
754 343 3328    ININ
755 345 06      X
756 346 01      SKMBZ   0           ;LMT CLK LOW?
757 347 CA      JP      +3          ;NO
758 348 6362    JMP     CLCA        ;YES,CLK OUT MSG
759 34A 41      SKT                 ;TIMER OVF?
760 34B 6342    JMP     CLC9        ;NO,WAIT
761 34D 32      RC                  ;YES, DEC COUNTER
762 34E 0F      LBI     0,0
763          CLC91:
764 34F 00      CLRA
765 350 40      COMP
766 351 30      ASC
767 352 44      NOP
768 353 04      XIS
769 354 4E      CBA
770 355 5D      AISC    13
771 356 634F    JMP     CLC91       ;NOT FINISHED
772 358 20      SKC                 ;COUNTER EXPIRED?
773 359 6240    JMP     CLCMD       ;YES,TOO LONG-RESET
774 35B 6342    JMP     CLC9        ;NO,WAIT
775          ERROR;                 ;SET ERROR BIT IN
776 35D 3393    LBI     LMDATL+1    ;STATUS FIELD
777 35F 4B      SMB     3
778 360 3354    OGI     4           ;TURN OFF CARRIER
779          CLCA:
```

| | | | | | |
|---|---|---|---|---|---|
| 780 | 362 | 3D | LBI | BFLG | ;CLK OUT MSG TO LMT |
| 781 | 363 | 4B | SMB | 3 | |
| 782 | 364 | 32 | RC | | ;CLR CARRY FOR SKIP AT SNDLMT |
| 783 | 365 | B3 | JSRP | SNDLMT | ;SEND SECOND SART BIT |
| 784 | 366 | 3396 | LBI | LMDAT | |
| 785 | | | CLCB: | | |
| 786 | 368 | B3 | JSRP | SNDLMT | ;SEND 4 BITS |
| 787 | 369 | B3 | JSRP | SNDLMT | |
| 788 | 36A | B3 | JSRP | SNDLMT | |
| 789 | 36B | B3 | JSRP | SNDLMT | |
| 790 | 36C | 07 | XDS | | ;DEC BD |
| 791 | 36D | 4E | CBA | | |
| 792 | 36E | 5E | AISC | 14 | ;BD=1? |
| 793 | 36F | F1 | JP | +2 | ;YES, END OF MSG |
| 794 | 370 | E8 | JP | CLCB | ;NO |
| 795 | 371 | 4B | SMB | 3 | ;LEAVE DATA LINE HIGH |
| 796 | 372 | 22 | SC | | ;SET C FOR SKIP IN SNDLMT |
| 797 | | | SNDLMA: | | ;SEND 1 BIT TO LMT |
| 798 | 373 | AF | JSRP | SUB1 | ;WAIT FOR CLK HIGH |
| 799 | 374 | 00 | CLRA | | |
| 800 | 375 | 13 | SKMBZ | 3 | ;DATA BIT=0? |
| 801 | 376 | 51 | AISC | 1 | ;NO, SET BIT IN AC |
| 802 | 377 | 3360 | LEI | 0 | ;DISABLE L LINES |
| 803 | 379 | 333C | CAMQ | | |
| 804 | 37B | 3364 | LEI | 4 | ;LATCH TO L LINES |
| 805 | 37D | 05 | LD | | ;SHIFT DATA LEFT |
| 806 | 37E | 31 | ADD | | |
| 807 | 37F | 06 | X | | |

| | | | | |
|---|---|---|---|---|
| 808 | 380 20 | SKC | | ;SENDING A MSG? |
| 809 | 381 6393 | JMP | SUB2A | ;YES,WAIT FOR CLK LOW & RET |
| 810 | 383 6240 | JMP | CLCMD | ;NO,RESTART |
| 811 | | RDLMTA: | | ;READ & STORE 1 BIT FROM LMT |
| 812 | 385 AF | JSRP | SUB1 | ;WAIT FOR CLK HIGH |
| 813 | 386 B1 | JSRP | SUB2 | ;WAIT FOR CLK LOW |
| 814 | 387 05 | LD | | ;SHIFT RAM LEFT & SAVE |
| 815 | 388 31 | ADD | | |
| 816 | 389 23BC | XAD | TEMP | |
| 817 | 38B 332E | INL | | ;READ DATA |
| 818 | 38D 233C | LDD | TEMP | ;RETRIEVE RAM |
| 819 | 38F 01 | SKMBZ | 0 | ;NEW BIT=1? |
| 820 | 390 51 | AISC | 1 | ;YES,SET BIT IN AC |
| 821 | 391 06 | X | | ;SAVE |
| 822 | 392 48 | RET | | |
| 823 | | SUB2A: | | ;WAIT FOR LMT CLK TO GO HIGH-TO LOW |
| 824 | | | | ;DELAY TO BE SURE IF NOT LOW AFTER |
| 825 | | | | ;1 SEC., ERROR HSS OCCURRED |
| 826 | 393 00 | CLRA | | |
| 827 | 394 52 | AISC | 2 | ;LOOP 14 TIMES |
| 828 | | SB4: | | |
| 829 | 395 23BC | XAD | TEMP | |
| 830 | 397 00 | CLRA | | |
| 831 | | SB5: | | ;CNT UP TO 16 SKT'S |
| 832 | 398 23BD | XAD | FLAGS | |
| 833 | 39A 3328 | ININ | | |
| 834 | 39C 06 | X | | |

```
835 39D 01        SKMBZ  0         ;CLK LINE LOW?
836 39E EA        JP     SB6       ;NO
837 39F 06        X                ;YES,RESTORE MEMORY
838 3A0 00        CLRA             ;DELAY 150 MICRO SEC
839 3A1 51        AISC   1
840 3A2 E1        JP     -1
841 3A3 3328      ININ
842 3A5 06        X
843 3A6 01        SKMBZ  0         ;STILL LOW?
844 3A7 EA        JP     SB6       ;NO
845 3A8 06        X                ;YES,RESTOR MEMORY
846 3A9 48        RET              ;GOOD RETURN
847         SB6:
848 3AA 06        X                ;RESTORE MEMORY
849 3AB 41        SKT              ;TIMER OVF?
850 3AC DA        JP     SB5+2     ;NO,WAIT
851 3AD 23BD      XAD    FLAGS     ;YES,INC CTR
852 3AF 51        AISC   1
853 3B0 D8        JP     SB5       ;NOT DONE
854 3B1 23BC      XAD    TEMP      ;INC OUTER CTR
855 3B3 51        AISC   1
856 3B4 D5        JP     SB4       ;DO AGAIN
857 3B5 6240      JMP    CLCMD     ;TOO LONG-RESTART
858        SUB1A:                  ;WAIT FOR LMT CLK LINE TO GO
859                                ;LOW-TO-HIGH,DELAY TO BE SURE IT IS
860                                ;REALLY HIGH IF LINE IS NOT HIGH AFTER
861                                ;1 SECOND, ERROR HAS OCCURRED
```

```
862 3B7 00          CLRA
863 3B8 52          AISC    2       ;LOOP 14 TIEMS
864       SB1:
865 3B9 23BC        XAD     TEMP
866 3BB 00          CLRA
867       SB2:
868 3BC 23BD        XAD     FLAGS   ;WAIT FOR UP TO 16 SKT'S
869 3BE 3328        ININ
870 3C0 06          X
871 3C1 01          SKMBZ   0       ;CLK HIGH
872 3C2 63D4        JMP     SB3     ;YES
873       SB21:
874 3C4 06          X               ;NO,RESTORE MEMORY
875 3C5 41          SKT             ;TIMER OVF?
876 3C6 63BE        JMP     SB2+2   ;NO,WAIT
877 3C8 23BD        XAD     FLAGS   ;YES,INC CTR
878 3CA 51          AISC    1
879 3CB 63BC        JMP     SB2     ;NOT DONE
880 3CD 23BC        XAD     TEMP
881 3CF 51          AISC    1       ;INC OUTER CTR
882 3D0 63B9        JMP     SB1     ;NOT DONE
883 3D2 6240        JMP     CLCMD   ;TOOLONG, RESTART
884       SB3:
885 3D4 06          X               ;RESTORE MEMORY
886 3D5 00          CLRA            ;DELAY 150 MICRO SEC
887 3D6 51          AISC    1
888 3D7 D6          JP      -1
889 3D8 3328        ININ
```

| | | | | |
|---|---|---|---|---|
| 890 | 3DA 06 | X | | |
| 891 | 3DB 01 | SKMBZ | 0 | ;STILL HIGH? |
| 892 | 3DC DF | JP | +3 | ;YES, GOOD RETURN |
| 893 | 3DB 63C4 | JMP | SB21 | ;NO,LOOP BACK |
| 894 | 3DF 06 | X | | ;RESTORE MEMORY |
| 895 | 3E0 48 | RET | | ;RETURN |
| 896 | | REBIT: | | ;READ 1 CARRIER BIT |
| 897 | 3E1 22 | SC | | |
| 898 | 3E2 4C | RMB | 0 | ;INIT BIT TO 0 |
| 899 | 3E3 00 | CLRA | | |
| 900 | 3E4 5E | AISC | 14 | ;LOOP TWICE |
| 901 | | RDB0: | | |
| 902 | 3E5 23B1 | XAD | BCH | ;OUTER LOOP CTR |
| 903 | 3E7 00 | CLRA | | |
| 904 | 3E8 55 | AISC | 5 | ;LOOP 11 TIMES |
| 905 | | RDB1: | | |
| 906 | 3E9 23BC | XAD | TEMP | ;INNER LOOP CTR |
| 907 | 3EB 3328 | ININ | | |
| 908 | 3ED 06 | X | | |
| 909 | 3EE 01 | SKMBZ | 0 | ;LMT CLK LOW? |
| 910 | 3EF 20 | SKC | | ;NO,SKIP 2 BYTES |
| 911 | 3F0 635D | JMP | ERROR | ;YES,SEND ERR RESPONSE |
| 912 | 3F2 06 | X | | |
| 913 | 3F3 58 | AISC | 8 | ;DATA-IN = 1? |
| 914 | 3F4 20 | SKC | | ;NO |
| 915 | 3F5 4D | SMB | 0 | ;YES,SET BIT IN BUFFER |
| 916 | 3F6 233C | LDD | TEMP | |
| 917 | 3F8 51 | AISC | 1 | |

```
918  3F9  E9      JP    RDB1    ;END OF INNER LOOP
919  3FA  2331    LDD   BCH
920  3FC  51      AISC  1
921  3FD  E5      JP    RDB0    ;END OF OUTER LOOP
922  3FE  48      RET
923              END
```

| | | | | | | | |
|---|---|---|---|---|---|---|---|
| BCH | 0031 | BCHLSB | 0030 | BFLG | 003E | BLD1 | 01DA |
| BLD2 | 01EF | BLD3 | 01F1 | BLDBCH | 01D2 | CALBCH | 0085 |
| CDAT | 0026 | CDATL | 0020 | CFL | 0022 | CFM | 0023 |
| CHK1 | 0062 | CHK2 | 0075 | CHKBCH | 005A | CLC1 | 024F |
| CLC2 | 0262 | CLC3 | 0276 | CLC31 | 027E | CLC4 | 0290 |
| CLC41 | 0295 | CLC42 | 0298 | CLC5 | 02AA | CLC51 | 02BF |
| CLC52 | 02C1 | CLC5C | 02BD | CLC6 | 02D9 | CLC61 | 02E0 |
| CLC62 | 02EB | CLC7 | 02F1 | CLC71 | 0303 | CLC8 | 0327 |
| CLC81 | 0330 | CLC9 | 0342 | CLC91 | 034F | CLCA | 0362 |
| CLCB | 0368 | CLCMD | 0240 | D188 | 00D1 | D1881 | 00D4 |
| D194 | 00AA | D197 | 00A7 | DEC13 | 0226 | DEC131 | 022D |
| DELAY | 00E7 | DLY | 00E9 | ERROR | 035D | FC4 | 0159 |
| FC5 | 0160 | FC6 | 016A | FDC61 | 0173 | FC62 | 0175 |
| FC7 | 018A | FLAGS | 003D | IDLS | 0034 | IDMID | 0035 |
| IDMS | 0036 | LMDAT | 0016 | LMDATL | 0012 | NMASK | 00A0 |
| PU1 | 0009 | PU2 | 0011 | RDB0 | 03E5 | RDB1 | 03E9 |
| RDBIT | 03E1 | RDC1 | 01B9 | RDCAR | 01B7 | RDLMT | 00B5 |
| RDLMTA | 0385 | SB1 | 03B9 | SB2 | 03BC | SB21 | 03C4 |
| SB3 | 03D4 | SB4 | 0395 | SB5 | 0398 | SB6 | 03AA |
| SC1 | 010C | SC2 | 0110 | SC3 | 0113 | SC4 | 0123 |
| SC61 | 0133 | SC7 | 013F | SC71 | 0141 | SC72 | 0152 |
| SC8 | 0155 | SC9 | 0180 | SCA | 018C | SCCRMD | 0108 |

| | | | | | | | |
|---|---|---|---|---|---|---|---|
| SEND | 0207 | SND1 | 0217 | SNDBIT | 00B9 | SNDLMA | 0373 |
| SNDLMT | 00B3 | STATE | 003F | SUB1 | 00AF | SUB1A | 03B7 |
| SUB2 | 00B1 | SUB2A | 0393 | T12LS | 0000 | T12MS | 0004 |
| TEMP | 003C | TW1 | 003D | TW2 | 004B | TW3 | 004E |
| TW4 | 0055 | TWTIM | 0039 | | | | |

What is claimed and desired to be secured by Letters Patent is:

1. In a bi-directional communication and control system,
a multipurpose two-way communication device coupled to a communication network line for receiving digital messages from and transmitting digital messages to said network, said device being operable in a first mode in which said device includes means for receiving and decoding a digital signal message from said network line and means responsive to the decoded message for executing a control function in accordance with an instruction contained in the decoded message, said device also being operable in a second mode in which said device includes means for receiving and storing a digital message from a master controller which includes an address portion and a function portion, means for generating a series of error checking bits the logic value of which is determined by the bits of said stored digital message, and means for developing a transmission output signal which includes at least the function portion of said stored digital message and said error checking bits.

2. A bi-directional communication and control system as set forth in claim 1, which includes means for generating a carrier signal of predetermined frequency, means for modulating said output signal on said carrier signal, and means for coupling said modulated carrier signal to said communication network line.

3. The control system of claim 1, wherein said device includes means operable in said second mode for changing the address portion of said stored digital message and including the changed address in said output signal.

4. The control system of claim 1, wherein said series of error checking bits comprise a plural bit BCH error checking code.

5. The control system of claim 1, wherein said received digital message from said network line includes a series of error checking bits and said device includes means operable in said first mode for calculating an error checking code based on the logic value of the bits of said received message other than said series of error checking bits, and means for comparing said calculated error checking code with said series of error checking bits of said received message.

6. The control system of claim 5, wherein said received message includes an address portion, and means controlled by said error checking bits comparing means for comparing said address portion of said received message with an address assigned to said device.

7. The control system of claim 1, wherein said device includes means operable in said second mode for altering the address portion of said stored digital message in accordance with an address assigned to said device and substituting said altered address portion in said output signal in place of said address portion of said stored digital message.

8. The control system of claim 1, wherein said received digital message from said network line includes a series of error checking bits and said device includes means operable in said first mode for calculating an error checking code based on the logic value of the bits of said received message other than said series of error checking bits, and means for producing a control signal when the respective bits of said calculated error checking code are the same as said series of error checking bits of said message received from said network line.

9. The control system of claim 8, wherein said message received from said network line includes an address portion, and means operative in response to said control signal for comparing said address portion of said received message with an address assigned to said device and developing a second control signal when said addresses are equal.

10. The control system of claim 9, wherein said device includes means operative in said first mode and responsive to said second control signal for executing said control function.

11. A multipurpose two-way communication device coupled to a communication network line for receiving digital messages from and transmitting digital messages to said network, said device being operable in a slave mode in which said device includes means for receiving and storing a digital message from said network line which includes a function portion and means responsive to the function portion of said stored message for executing a control function in accordance therewith, said device also being operable in a master mode in which said device includes means for receiving and storing a digital message from a master controller which includes a function portion, and means for developing a digital transmission output signal for said network line which includes two start bits and said function portion of said stored master message.

12. A device as claimed in claim 11, wherein said master message also includes an address portion, and means operative in said master mode of said device for altering said stored address portion of said master message and including said altered address in said transmission output signal.

13. A bidirectional communication and control system which includes a device as set forth in claim 11, means for generating a carrier signal of predetermined frequency, means for modulating said transmission output signal on said carrier signal, and means for coupling said modulated carrier signal to said communication network line.

14. A system as set forth in claim 13, wherein said first start bit of said modulated carrier signal comprises the presence of carrier on said network line and said second start bit comprises the absence of carrier on said line.

15. A system as set forth in claim 13, wherein each bit of said modulated carrier signal other than said start bits comprise a first carrier-on portion of predetermined duration and a second data portion in which carrier is present or absent depending upon the logic value of said bit.

16. A system as set forth in claim 13, which includes means for receiving a modulated carrier signal reply message from said communication network line, said receiving means including a phase lock loop circuit including an oscillator having a center frequency corresponding to the unmodulated carrier frequency of said reply message.

17. A system as set forth in claim 16, wherein said phase lock loop oscillator is also employed as said carrier signal generating means when said modulated carrier signal is coupled to said communication network line.

18. A system as set forth in claim 11, wherein said device includes a control input terminal, means operative in response to a first electrical condition of said control terminal for establishing said first mode of operation of said device, and means operative in response to a different electrical condition of said control terminal for establishing said second mode of operation of said device.

19. A system as set forth in claim 18, wherein said device includes a microprocessor having first program means for establishing said first mode of operation and second program means for establishing said second mode of operation, and means operative in response to the electrical condition of said control terminal for selecting one of said first and second program means.

20. A device as set forth in claim 11, wherein said device includes a control input terminal, means operative in response to a first electrical condition of said control terminal for establishing said slave mode of operation of said device, and mean operative in response to a different electrical condition of said control terminal for establishing said master mode of operation of said device.

21. A device as set forth in claim 20, wherein said device includes a microprocessor having first program means for establishing said slave mode of operation and second program means for establishing said master mode of operation, and means operative in response to the electrical condition of said control terminal for selecting one of said first and second program means.

22. In a communication and control system, the combination of, a common network line, transmitting means for placing on said network line an on-off keyed carrier signal message having a plurality of data bits each of which comprises a first carrier-on portion of predetermined duration and a succeeding data portion in which carrier is present or absent depending upon the logic value of said bit, and receiving means coupled to said network line for detecting said message, said receiving means including means for periodically sampling each bit of said message over a time interval which starts during the carrier-on portion of one bit and ends during the carrier-on portion of the next bit, and means controlled by said sampling means for assigning a first logic value to the sampled bit if all of the samples during a given interval correspond to the presence of carrier and a second logic value to the sampled bit if any one of the samples during said given interval corresponds to the absence of carrier.

23. The combination of claim 22, wherein the presence of carrier in said data portion of each bit of said message placed on said network line denotes a logic value of "0".

24. The combination of claim 22, wherein said receiving means includes a microprocessor, means for coupling said network line to a data input of said microprocessor, said sampling means comprising a program for reading said data input, the period of said sampling means being determined by the run time of said program.

25. The combination of claim 22 wherein said receiving means includes microprocessor means coupled to said network line and programmed to read the received carrier signal message a number of times during each bit thereof, the number of times each bit is read being determined by the loop running time of said program.

26. The combination of claim 22, which includes a phase lock loop circuit coupled to said network line, and said sampling means comprising microprocessor means having a data input connected to the output of said phase lock loop circuit.

27. The combination of claim 26, wherein said microprocessor means including a program for repeatedly reading the output of said phase lock loop circuit, the number of times each bit is read being determined by the run time of said program.

28. The combination of claim 22, wherein said message placed on said network line includes two start bits each having a duration equal to a data bit thereof.

29. The combination of claim 23, wherein said message placed on said network line includes two start bits each having a duration equal to a data bit thereof, said first start bit having a logic value of "0".

30. The combination of claim 29, wherein said second start bit has a first portion having a logic value of "0" and a second portion having a logic value of "138".

31. The combination of claim 30, wherein said first and second portions of said second start bit are of equal duration.

32. The combination of claim 30, wherein said sampling means is synchronized with the "0" to "1" transition of said second start bit.

* * * * *